United States Patent
Yamauchi et al.

(10) Patent No.: US 12,454,766 B2
(45) Date of Patent: Oct. 28, 2025

(54) ELECTRODE CATALYST AND METHOD FOR PRODUCING AMINE COMPOUND

(71) Applicant: JAPAN SCIENCE AND TECHNOLOGY AGENCY, Saitama (JP)

(72) Inventors: Miho Yamauchi, Fukuoka (JP); Takashi Fukushima, Fukuoka (JP); Sho Akai, Fukuoka (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 245 days.

(21) Appl. No.: 17/412,426

(22) Filed: Aug. 26, 2021

(65) Prior Publication Data

US 2022/0042188 A1 Feb. 10, 2022

Related U.S. Application Data

(63) Continuation of application No. PCT/JP2020/008535, filed on Feb. 28, 2020.

(30) Foreign Application Priority Data

Feb. 28, 2019 (JP) .................................. 2019-036303

(51) Int. Cl.
*C25B 3/09* (2021.01)
*C25B 3/25* (2021.01)
(Continued)

(52) U.S. Cl.
CPC .............. *C25B 11/077* (2021.01); *C25B 3/09* (2021.01); *C25B 9/19* (2021.01); *C25B 11/065* (2021.01); *C25B 13/00* (2013.01)

(58) Field of Classification Search
CPC .................................... C25B 3/09; C25B 3/25
(Continued)

(56) References Cited

U.S. PATENT DOCUMENTS

| 4,248,677 A | * | 2/1981 | Kato ......................... C25B 3/25 |
| | | | 205/435 |
| 4,568,432 A | | 2/1986 | Rogers |

(Continued)

FOREIGN PATENT DOCUMENTS

| CN | 107460497 A | * | 12/2017 | ............... C25B 3/00 |
| CN | 109647366 A | | 4/2019 | |

(Continued)

OTHER PUBLICATIONS

Cook et al., "Electrochemical Amination Reaction for Amino Acid Synthesis," Journal of the Electrochemical Society (Jun. 1, 1989), vol. 136, No. 6, pp. 1845-1846. (Year: 1989).*

(Continued)

*Primary Examiner* — Edna Wong
(74) *Attorney, Agent, or Firm* — Troutman Pepper Locke LLP; Tim Tingkang Xia, Esq.

(57) ABSTRACT

An electrode catalyst in which a metal or a metal oxide is supported on an electrode support composed of a conductive substance is provided. It is preferable that the electrode support contain one or more metals which are selected from the group consisting of a transition metal and a typical metal in Groups 12 to 14 or a carbon material and the metal or the metal oxide contain one or more metals which are selected from the group consisting of a transition metal and a typical metal in Groups 12 to 14 or a metal oxide.

4 Claims, 15 Drawing Sheets

(51) Int. Cl.
*C25B 9/19* (2021.01)
*C25B 11/065* (2021.01)
*C25B 11/077* (2021.01)
*C25B 13/00* (2006.01)

(58) Field of Classification Search
USPC .......................................................... 205/431
See application file for complete search history.

(56) References Cited

U.S. PATENT DOCUMENTS

| | | | | |
|---|---|---|---|---|
| 5,164,060 | A | * | 11/1992 | Eisman ............... H01M 8/0289 521/27 |
| 5,919,349 | A | * | 7/1999 | Huber .................... C25B 11/04 205/423 |
| 2007/0292744 | A1 | | 12/2007 | Lopez et al. |
| 2018/0057949 | A1 | * | 3/2018 | Choi ........................ C25B 3/25 |
| 2018/0305830 | A1 | * | 10/2018 | Richter .................... C25B 3/23 |
| 2019/0134609 | A1 | | 5/2019 | Yamauchi et al. |

FOREIGN PATENT DOCUMENTS

| | | |
|---|---|---|
| DE | 10040401 A1 | 2/2002 |
| EP | 2136426 A1 | 12/2009 |
| EP | 3808449 A1 | 4/2021 |
| JP | 2007514520 A | 6/2007 |
| WO | 2016038349 A1 | 3/2016 |
| WO | 20170154743 A1 | 9/2017 |
| WO | 2019240200 A1 | 12/2019 |

OTHER PUBLICATIONS

Smirnov et al., "Electrochemical Reductive Amination," Zhurnal Organicheskoi Khimii (Jan. 1, 1992), vol. 28, No. 1, pp. 1-6. (Year: 1992).*

Sadakiyo et al., "Electrochemical Hydrogenation of Non-Aromatic Carboxylic Acid Derivatives as a Sustainable Synthesis Process: From Catalyst Design to Device Construction," Physical Chemistry Chemical Physics (2019), vol. 21, No. 11, pp. 5882-5889. (Year: 2019).*

Anne et al., "Can the Combination of Electrochemical Regeneration of NAD+, Selectivity of L-α-Amino-Acid Dehydrogenase, and Reductive Amination of α-Keto-Acid Be Applied to the Inversion of Configuration of a L-α-Amino-Acid?," Biotechnology and Bioengineering (Jul. 5, 1999), vol. 64, No. 1, pp. 101-107 (Year: 1999).*

Jeffery et al., "Electrochemical Synthesis of Amino Acids by Reductive Amination of Keto Acids. I. Reduction at Mercury Electrodes," Australian Journal of Chemistry (1978), vol. 31, No. 1, pp. 73-78. (Year: 1978).*

Jeffery et al., "Electrochemical Synthesis of Amino Acids by Reductive Amination of Keto Acids. II. Reduction at Platinum Black and Palladium Black Electrodes," Australian Journal of Chemistry (1978), vol. 31, No. 1, pp. 79-84. (Year: 1978).*

Kim et al., "Pd Catalyst Promoted by Two Metal Oxides with Different Reducibilities: Properties and Performance in the Selective Hydrogenation of Acetylene," Applied Catalysis A: General (Feb. 10, 2014), vol. 471, pp. 80-83. (Year: 2014).*

Japan Patent Office, "International Search Report for PCT Application No. PCT/JP2020/008535", Japan, May 26, 2020.

J. Becker et al., Systems and synthetic metabolic engineering for amino acid3 production—the heartbeat of industrial strain development, Current Opinion in Biotechnology 2012, 23:718-726.

C. Nájera et al., Catalytic Asymmetric Synthesis of α-Amino Acids, Chem. Rev. 2007,107, 4584-4671.

J. Wang et al., Asymmetric Strecker Reactions, Chemical Reviews, 2011, 111, 6947-6983.

T. Nonaka et al., Modified Electrodes and Their Applications to ElectroorganicReactions,Journal of Synthetic Organic Chemistry, vol. 43, issue 6, 1985 and partial translation.

S. Abe et al., Electroorganic Reactions on Organic Electrodes, 1. Asymmetric Reduction of Prochiral Activated Olefins on a Poly-L-valine-Coated Graphite, J. Am. Chem. Soc. 1983, 105, 3630-3632.

T. Nonaka et al., Electro-organic Reactions on Organic Electrodes. Part 2. Electrochemical Asymmetric Reduction of Citraconic and Mesaconic Acids on Optically-active Poly(amino-acid)-coated Electrodes, Bull. Chem. Soc. Jpn., vol. 56,No. 9, 2778-2783, 1983.

Chem-Station (https://www.chem-station.com/blog/2017/09/diazidation.html), retrieved on Feb. 2018 and partial translation.

S. Abe et al., Electrochemical Asymmetric Reduction of Prochiral Carbonyl Compounds, Oximes, and A gem-Dihalide on a Poly-L-Valine-Coated GraphiteElectrode, Chemisry Letters, The Chemical Society of Japan, pp. 1033-1036, 1983.

T. Fukushima et al., Electrosynthesis of amino acids from biomass-derivable acids ontitanium dioxide, Chem. Commun. 2019, vol. 55, No. 98, 14721-14724.

Office Action issued by the Japan Patent Office for Application No. 2021-502670 on Aug. 22, 2023.

European Patent Office, European Search Report for EP Application No. 20763208.4, Europe, Mar. 13, 2023.

Office Action issued by the State Intellectual Property Office of the Peoples Republic of China for Application No. 202080031696.8 on Nov. 1, 2023.

* cited by examiner

Cu-12%

Mo-20%

ELECTRODE CATALYST AND METHOD FOR PRODUCING AMINE COMPOUND

CROSS-REFERENCE TO RELATED PATENT APPLICATION

This application claims the priority of Japanese Patent Application No. 2019-036303, filed Feb. 28, 2019, the whole content of which is incorporated herein by reference.

TECHNICAL FIELD

The present invention relates to an electrode catalyst, an electrochemical cell, a method for producing an amine compound, and a membrane electrode assembly; and particularly relates to an electrode catalyst which is more suitable for a compound obtained by introducing an amino group at the α-position of a carboxyl group, a method for producing an α-amino acid in which the catalyst is utilized, and a membrane electrode assembly and an electrochemical cell for synthesizing the α-amino acid.

BACKGROUND OF THE INVENTION

The use of biomass resources composed of carbon derived from atmospheric carbon dioxide is considered to be an effective way to reduce the consumption of petroleum resources. In recent years, the production of bioalcohols such as ethanol and ethylene glycol has been industrialized and these are used as fuels and raw materials.

The inventors of the present invention have reported a method for producing alcohols by hydrogenating carboxylic acids which are plentifully included in biomass resources.

For example, Patent Document 1 proposes a method for synthesizing an alcohol in which an alcohol can be synthesized from carboxylic acids in high selectivity and high yield with a titanium oxide electrochemical catalyst having a specific structure.

Incidentally, amino acids are utilized in umami seasonings in the food field, feed additives for livestock, and the like. In recent years, the demand for amino acids has increased significantly due to the expansion of applications thereof. Currently, amino acids are mainly produced through fermentation methods.

Fermentation methods include fermenting molasses obtained from sugar cane or the like using microorganisms in the presence of a nitrogen source such as ammonia and separating and purifying amino acids from the obtained fermented solution (for example, refer to Non-Patent Document 1). Fermentation methods are used mainly in the food industry to produce amino acids. Fermentation methods do not utilize fossil fuel-derived raw materials which cause global warming and for which there is continuing concern regarding the depletion thereof. In this respect, fermentation methods are expected to provide environmentally friendly and sustainable industrial production.

However, when amino acids are produced through a fermentation method, the following (1) to (4) have been pointed out.

(1) Sugars are utilized as raw materials for which there is a concern concerning competition with edible foodstuffs.

(2) A large amount of energy is consumed for a flow of oxygen to a fermented solution and the stirring of the fermented solution performed in a fermentation process.

(3) A large amount of water is used.

(4) It takes time to perform production.

As a method for producing amino acids other than the fermentation method, there is a chemical synthesis method (for example, refer to Non-Patent Document 2). In this chemical synthesis method, it is possible to efficiently produce amino acids in a short time using petroleum-derived chemicals as raw materials. As the chemical synthesis method, an amino acid synthesis method of the Strecker reaction (refer to Non-Patent Document 3) is known. In the Strecker reaction, an ammonia and a cyanide is reacted with an aldehyde as represented by the following Formula (1). Chemical synthesis methods are utilized in the industrial production of some amino acids.

Chemical Formula 1

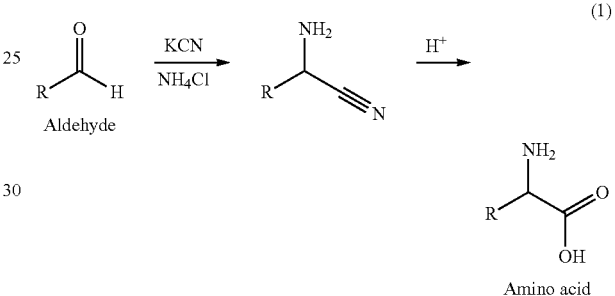

Since the latter half of the 1950s, several cases in which amino acid synthesis through a reductive amination reaction of an α-keto acid is performed electrochemically have been reported (for example, Non-Patent Documents 4 to 8). However, in all reports, the Faraday efficiencies of the electrochemical reactions is about 50 to 80%. Furthermore, in these electrochemical reactions, toxic substances such as lead and mercury are utilized as catalysts. These catalysts are not preferred for industrial use.

CITATION LIST

Patent Document 1: PCT International Publication No. WO 2017/154743.
Non-Patent Document 1: J. Becker, C. Wittmann, Curr Opin. Biotechnol. 2012, 23, 718 to 726.
Non-Patent Document 2: C. Najera, J. M. Sansano, Chem. Rev. 2007, 107, 45.
Non-Patent Document 3: J. Wang, X. Liu, X. Feng, Chem. Rev. 2011, 111, 6947 to 6983.
Non-Patent Document 4: Synthetic Organic Chemistry, Vol. 43, No. 6 (1985).
Non-Patent Document 5: S. Abe, T. Nonaka, T. Fuchigami, J. Am. Chem. Soc., 105, 3630 (1983).
Non-Patent Document 6: S. Abe, T. Fuchigami, T. Nonoka, Chem. Lett., 1983, 1033.
Non-Patent Document 7: T. Nonaka, S. Abe, T. Fuchigami, Bull. Chem. Soc. Jpn., 56, 2778 (1983).
Non-Patent Document 8: https://www.chem-station.com/blog/2017/09/diazidation.html (retrieved in February 2018).

SUMMARY OF THE INVENTION

Technical Problem

The present invention was made in view of the above circumstances, and an object of the present invention is to provide an electrode catalyst which can be produced using only a material having a large amount of resources and has a function of promoting the production of an amine compound.

Also, an object of the present invention is to provide an electrochemical cell including the above electrode catalyst provided therein and a method for producing an amine compound using the same.

Furthermore, an object of the present invention is to provide a membrane electrode assembly including the above electrode catalyst provided therein.

Solution to the Problem (1) An electrode catalyst, in which a metal or a metal oxide is supported on an electrode support composed of a conductive substance.

(2) In the electrode catalyst set forth in (1), the electrode support contains one or more metals selected from the group consisting of a transition metal and a typical metal in Groups 12 to 14, or a carbon-based material, and the above metal or a metal oxide includes one or more kinds of a metal or a metal oxide, wherein the metal is selected from a transition metal and a typical metal in Groups 12 to 14.

(3) In the electrode catalyst set forth in (2), the metal contained in the electrode support is one or more metals selected from the group consisting of a transition metal in Groups 4 to 11 and a typical metal in Groups 12 to 14, and the metal or the metal oxide supported on the electrode support is one or more metals selected from the group consisting of a transition metal in Groups 4 to 11 and a typical metal in Groups 12 to 14 or metal oxides.

(4) In the electrode catalyst set forth in any one of (1) to (3), the metal oxide is supported on the electrode support, and the metal oxide is an oxide of a metal having the same element as the metal contained in the electrode support.

(5) In the electrode catalyst set forth in (4), fine particles of a metal oxide wherein the metal is titanium or a metal containing titanium are also supported on the metal oxide supported on the electrode support.

(6) In the electrode catalyst set forth in (5), the fine particles of a metal oxide wherein the metal is titanium or a metal containing titanium include composite oxides represented by the following Formula [1A]: $Ti_nM_mO_x$ [1A]. (In Formula [1A], M is one or more metals selected from the group consisting of a transition metal and a typical metal in Groups 12 to 14; x is a value which satisfies an oxidation state of Ti and M; $0 < n \leq 1$, $0 \leq m < 1$, and $n+m=1$; and when $m=0$, Formula [1A] represents titanium oxide.)

(7) An electrochemical cell containing an anode and a cathode, wherein the cathode contains an electrode catalyst, the electrode catalyst contains a metal or a metal oxide supported on an electrode support composed of a conductive substance, the electrode support contains one or more metals selected from the group consisting of a transition metal and a typical metal in Groups 12 to 14, or a carbon-based material, and the above metal or a metal oxide includes one or more metals selected from the group consisting of a transition metal and a typical metal in Groups 12 to 14 or a metal oxide.

(8) In the electrochemical cell set forth in (7), the metal contained in the electrode support includes one or more metals selected from the group consisting of a transition metal in Groups 4 to 11 and a typical metal in Groups 12 to 14, and the metal or the metal oxide supported on the electrode support includes one or more metals selected from the group consisting of a transition metal in Groups 4 to 11 and a typical metal in Groups 12 to 14 or a metal oxide.

(9) In the electrochemical cell set forth in (7) or (8), the metal oxide is supported on the electrode support, and the metal oxide is an oxide of a metal having the same element as the metal contained in the electrode support.

(10) In the electrochemical cell set forth in (9), fine particles of a metal oxide wherein the metal is titanium or a metal containing titanium are further supported on the metal oxide supported on the electrode support.

(11) In the electrochemical cell set forth in (10), the fine particles of a metal oxide wherein the metal is titanium or a metal containing titanium include composite oxides represented by the following Formula [1A]: $Ti_nM_mO_x$ [1A]. (In Formula [1A], M is one or more metals selected from the group consisting of a transition metal and a typical metal in Groups 12 to 14; x is a value which satisfies an oxidation state of Ti and M; $0 < n \leq 1$, $0 \leq m < 1$, and $n+m=1$; and when $m=0$, Formula [1A] represents titanium oxide.)

(12) In a method for producing an amine compound using an electrochemical cell including an anode and a cathode, the cathode includes an electrode catalyst in which a metal or a metal oxide is supported on an electrode support composed of a conductive substance, the electrode support contains one or more metals selected from the group consisting of a transition metal and a typical metal in Groups 12 to 14, or a carbon-based material, the metal or the metal oxide includes one or more kinds of metals selected from the group consisting of a transition metal and a typical metal in Groups 12 to 14 or a metal oxide, and an amine compound is produced by supplying a carbonyl compound and a nitrogen compound to the cathode and applying a voltage between the anode and the cathode.

(13) In the method for producing an amine compound set forth in (12), the metal contained in the electrode support includes one or more metals selected from the group consisting of a transition metal in Groups 4 to 11 and a typical metal in Groups 12 to 14, and the metal or the metal oxide supported on the electrode support includes one or more metals selected from the group consisting of a transition metal in Groups 4 to 11 and a typical metal in Groups 12 to 14 or a metal oxide.

(14) In the method for producing an amine compound set forth in (12) or (13), the metal oxide is supported on the electrode support, and the metal oxide is an oxide of a metal having the same element as the metal contained in the electrode support.

(15) In the method for producing an amine compound set forth in (14), fine particles of a metal oxide wherein the metal is titanium or a metal containing titanium are further supported on the metal oxide supported on the electrode support.

(16) In the method for producing an amine compound set forth in (15), the fine particles of a metal oxide wherein the metal is titanium or a metal containing titanium include composite oxides represented by the following Formula [1A]: TinMmOx [1A]. (In Formula [1A], M is one or more metals selected from the group consisting of a transition metal and a typical metal in Groups 12 to 14; x is a value which satisfies an oxidation state of Ti and M; $0<n\leq1$, $0\leq m<1$, and $n+m=1$; and when $m=0$, Formula [1A] represents titanium oxide.)

(17) In the method for producing an amine compound set forth in any one of (12) to (16), the carbonyl compound is an α-keto acid.

(18) In the method for producing an amine compound set forth in any one of (12) to (17), the nitrogen compound is ammonia.

(19) In the method for producing an amine compound set forth in any one of (12) to (17), the nitrogen compound is hydroxylamine.

(20) A membrane electrode assembly which includes an anode, a cathode, an electrolyte membrane and in which the electrolyte membrane is disposed between the anode and the cathode, wherein the cathode contains an electrode catalyst, the electrode catalyst contains a metal or a metal oxide supported on an electrode support composed of a conductive substance, the electrode support contains one or more metals selected from the group consisting of a transition metal and a typical metal in Groups 12 to 14, or a carbon-based material, and the metals or the metal oxide contains one or more metals selected from the group consisting of a transition metal and a typical metal in Groups 12 to 14 or a metal oxide.

(21) In the membrane electrode assembly set forth in (20), the metal contained in the electrode support includes one or more metals selected from the group consisting of a transition metal in Groups 4 to 11 and a typical metal in Groups 12 to 14, and the metal or the metal oxide supported on the electrode support includes one or more metals selected from the group consisting of a transition metal in Groups 4 to 11 and a typical metal in Groups 12 to 14 or a metal oxide.

(22) In the membrane electrode assembly set forth in (20) or (21), the metal oxide is supported on the electrode support, and the metal oxide is an oxide of a metal having the same element as the metal contained in the electrode support.

(23) In the membrane electrode assembly set forth in (22), fine particles of a metal oxide wherein the metal is titanium or a metal containing titanium are further supported on the metal oxide supported on the electrode support.

(24) In the membrane electrode assembly set forth in (23), the fine particles of a metal oxide wherein the metal is titanium or a metal containing titanium include composite oxides represented by the following Formula [1A]: TinMmOx [1A]. (In Formula [1A], M is one or more metals selected from the group consisting of a transition metal and a typical metal in Groups 12 to 14; x is a value which satisfies an oxidation state of Ti and M; $0<n\leq1$, $0\leq m<1$, and $n+m=1$; and when $m=0$, Formula [1A] represents titanium oxide.)

(25) A method for producing an amine compound uses: the membrane electrode assembly set forth in any one of (20) to (24).

(26) In the electrode catalyst set forth in (1) or (2), the electrode support contains a carbon-based material composed of graphene or a carbon nanotube.

(27) In the electrode catalyst set forth in (3), the electrode support is a calcined molded metal body.

(28) In the electrode catalyst set forth in any one of (1) to (3), the electrode support has a plate-shaped or mesh structure and/or a three-dimensional network structure.

(29) In the electrode catalyst set forth in any one of (1) to (3), the electrode support is composed of titanium

(30) The electrode catalyst set forth in any one of (1) to (6) is used when an amine compound is produced by a reductive amination reaction using a carbonyl compound and a nitrogen compound as raw materials.

(31) In the electrode catalyst set forth in (30), the carbonyl compound is an α-keto acid.

(32) In the electrode catalyst set forth in (30), the nitrogen compound is ammonia.

(33) In the electrode catalyst set forth in (30), the nitrogen compound is hydroxylamine.

(34) In the electrode catalyst set forth in (6), the composite oxide contains an anatase type crystal structure.

(35) The electrode catalyst set forth in any one of (1) to (3) which includes an electrode support composed of a porous conductive substance and titanium oxide supported on the electrode support, and the titanium oxide has an anatase type crystal structure and has ridges and vertices.

(36) The method for producing an amine compound using the membrane electrode assembly set forth in any one of (20) to (24) includes supplying water or steam to the anode.

(37) In the method for producing an amine compound using the membrane electrode assembly set forth in any one of (20) to (24), raw materials are supplied from a flow cell to the anode and the cathode.

(38) In a method for production of an amine compound using an electrochemical cell including an anode and a cathode, an electrode catalyst is provided on the cathode, the electrode catalyst has an electrode support composed of a porous conductive material and titanium oxide supported on the electrode support, the titanium oxide has an anatase type crystal structure and has ridges and vertices, and an amine compound is produced by supplying a carbonyl compound and a nitrogen compound to the cathode and applying a voltage between the anode and the cathode.

(39) In the method for producing an amine compound set forth in (38), the electrode support contains a carbon-based material composed of graphene or a carbon nanotube.

(40) In the membrane electrode assembly set forth in any one of (20) to (24), an anode, a cathode, and an electrolyte membrane disposed between the anode and the cathode are provided, an electrode catalyst is provided on the cathode, the electrode catalyst has an electrode support composed of a porous conductive substance and titanium oxide supported on the electrode support, and the titanium oxide has an anatase type crystal structure and has ridges and vertices.

(41) In the membrane electrode assembly set forth in any one of (20) to (24), an anode, a cathode, and an electrolyte membrane disposed between the anode and the cathode are provided, the cathode includes an electrode catalyst in which a metal or a metal oxide is supported on an electrode support composed of a conductive substance, the electrode support contains one or more metals selected from the group consisting of a transition metal and a typical metal in Groups 12 to 14, or a carbon-based material, a means for supplying a carbonyl compound and a nitrogen compound to the cathode is provided, and a means for supplying water or steam to the anode is provided.

Advantageous Effects of the Invention

The electrode catalyst of the present invention can be produced using only materials having a large amount of resources. Furthermore, the electrode catalyst of the present invention has a function of promoting a reductive amination reaction of a carboxyl group and promoting the production of an amine compound through a reductive amination reaction in which a carbonyl compound and a nitrogen compound are used as raw materials. For this reason, it is possible to produce an amine compound by performing the reductive amination reaction in which a carbonyl compound and a nitrogen compound are used as raw materials in the presence of the electrode catalyst of the present invention.

In the method for producing an amine compound of the present invention, an electrochemical cell including the electrode catalyst of the present invention provided therein is utilized as a cathode. For this reason, when a carbonyl compound and a nitrogen compound are supplied to the cathode, a voltage is applied between an anode and the cathode, and protons are supplied from the anode to the cathode, it is possible to produce an amine compound. Therefore, according to the method for producing an amine compound of the present invention, it is possible to produce an amine compound without using environmentally regulated substances and precious metals having a small amount of resources.

Also, since the membrane electrode assembly of the present invention includes the electrode catalyst of the present invention at the cathode, it is possible to appropriately utilize the membrane electrode assembly when an amine compound is produced through a reductive amination reaction.

DETAILED DESCRIPTION OF THE INVENTION

Figure 1:
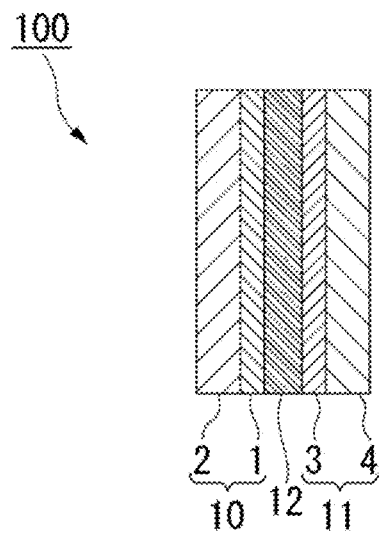
FIG. 1 is a schematic constitution diagram showing an example of a membrane electrode assembly for synthesizing an amine compound in an embodiment.

In this specification, an "amine compound" may refer to an amino acid in some cases.

An acid in which an α carbon atom of an aliphatic carboxylic acid is a carbonyl carbon atom is generally called an α-keto acid. An α-keto acid is a precursor of an α amino acid in vivo. The reductive amination reaction of α-keto acids represented by the following Formula (2) is known as a biosynthetic-like pathway.

Chemical Formula 2

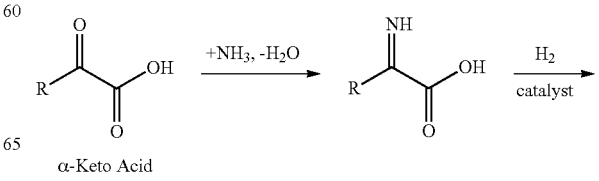

α-Keto Acid

-continued

Amino Acid

However, at present, it cannot be said that a technique for efficiently producing an amino acid from an α-keto acid which is a raw material using a method having a low environmental load has been sufficiently established.

For this reason, there is a demand for an amino acid production method capable of producing an amino acid having a small amount of energy consumption using a raw material which does not compete with food.

In recent years, it has become possible to produce a large number of carboxylic acids by chemically decomposing woody biomass which does not compete with food and has a low environmental load. Carboxylic acids derived from woody biomass include oxalic acid, glycolic acid, lactic acid, malic acid, and 4-hydroxyphenyl lactic acid which can be converted into α-keto acids through a simple one-step redox reaction (reference literature: "M. Besson, P. Gallezot, C. Pinel, Chem. Rev. 2014, 114, 1827-1870." and "M. Dusselier, P. V. Wouwe, F. Clippel, J. Dijkmans, D. W. Gammon, B. F. Sels, ChemCatChem 2013, 5, 569 to 575."). As represented by the following Formulas (3) to (7), oxalic acid, glycolic acid, lactic acid, malic acid, and 4-hydroxyphenyl lactic acid are oxidized or reduced to an α-keto acid. The produced α-keto acid produces an amino acid through a reductive amination reaction as represented by Formulas (3) to (7).

Therefore, some amino acids are expected to be produced using raw materials derived from woody biomass.

Chemical Formula 3

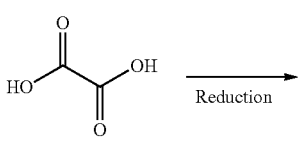

Oxalic Acid (3)

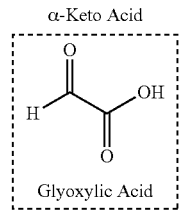 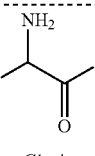

Chemical Formula 4

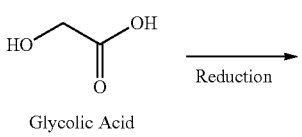

Glycolic Acid (4)

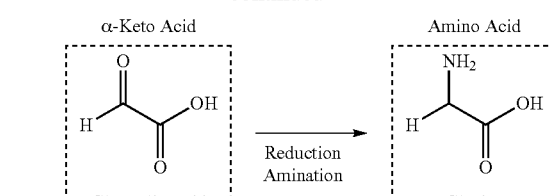

Chemical Formula 5

(5)

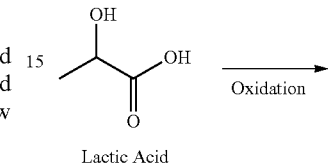

Lactic Acid

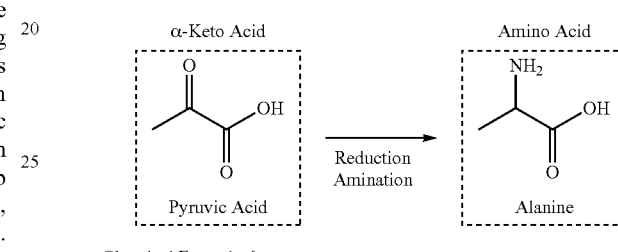

Chemical Formula 6

(6)

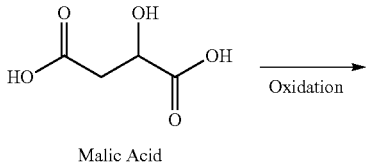

Malic Acid

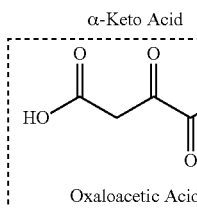

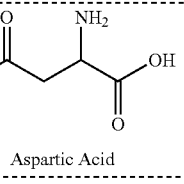

Chemical Formula 7

(7)

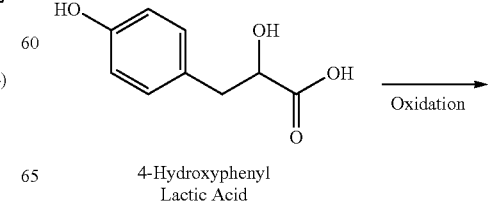

4-Hydroxyphenyl Lactic Acid

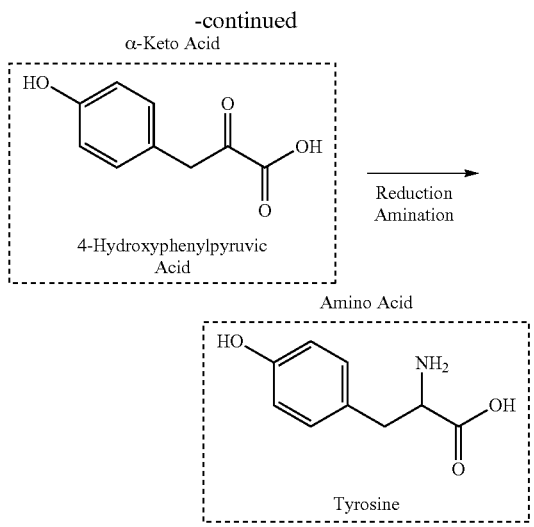

In the reductive amination reaction of α-keto acids, hydrogen is generally utilized as a hydrogen source and a reducing agent. Currently, most of hydrogen is produced by reforming fossil fuels such as natural gas and naphtha. For this reason, if water could be used as a hydrogen source instead of hydrogen and the reductive amination reaction of α-keto acids could thereby proceed, for example, using electric power derived from regenerative energy, amino acids could be produced with a small environmental load.

Electrode Catalyst

The electrode catalyst in the embodiment includes an electrode support composed of a conductive substance and a metal or a metal oxide supported on the electrode support.

Electrode Support

The electrode support in the electrode catalyst in the embodiment is composed of the conductive substance.

The electrode support contained in the electrode catalyst in the embodiment may be a conductive substance, and preferably includes one or more metals selected from the group consisting of a transition metal and a typical metal in Groups 12 to 14, or a carbon-based material.

The metal included in the electrode support is preferably one or more metals selected from the group consisting of a transition metal in Groups 4 to 11 and a typical metal in Groups 12 to 14. The transition metals are more preferably one or more metals selected from the group consisting of Co, Mo, Nb, Ni, V, W, Zr, Ti, Fe, and Cu. The typical metals are more preferably one or more metals selected from the group consisting of Al, Ga, and Sn.

The electrode support in the electrode catalyst in the embodiment may be composed of a carbon-based material.

Examples of carbon-based materials include acetylene black, Ketjen black (registered trademark), amorphous carbon, carbon nanohorns, graphene, carbon nanotubes, and the like. Among these carbon-based materials, it is preferable to utilize graphene or carbon nanotubes because a high-performance electrode catalyst having excellent durability can then be obtained due to its good electrical conductivity and chemical stability.

The electrode support in the electrode catalyst in the embodiment contains a metal or a carbon-based material, and if necessary, may contain one kind or two or more kinds of conductive materials such as conductive glass which is a silicon-based material and carbides, nitrides, or carbonitrides of a metal.

The electrode support in the electrode catalyst in the embodiment is preferably porous.

In this specification, the porous electrode support means a structure having pores of various sizes on an inner side and an outer side of the electrode support.

If the electrode support is porous, when a reductive amination reaction in which a carbonyl compound and a nitrogen compound are utilized as raw materials is performed in the presence of the electrode catalyst in the embodiment, it is preferable that the metal or the metal oxide supported on the electrode support have active sites having a sufficient density necessary for the reductive amination reaction.

Also, if the electrode support is porous, when the electrode catalyst in the embodiment is utilized for the reductive amination reaction in which a carbonyl compound and a nitrogen compound are utilized as raw materials, it is preferable that the electrode catalyst, a substrate, and a product material be easily brought into contact with each other in a flowing state. Moreover, if the electrode support is porous, the electrode catalyst is less likely to interfere with a flow of substrate in a reactor, which is preferable.

The porous electrode support may be, for example, a carrier having a surface with a microstructure formed thereon, a carrier obtained by aggregating a conductive carbon compound such as carbon nanotubes, or a carrier having a mesh structure formed of a metal or an oxide containing transition metal ions. When the electrode support in the embodiment has a mesh structure, each lattice constituting the mesh structure may further have a three-dimensional network structure.

When the electrode support is porous, it is particularly preferable to have a mesh structure and/or a three-dimensional network structure composed of titanium (Ti). When the electrode support has a mesh structure and/or a three-dimensional network structure composed of titanium and the metal or the metal oxide supported on the electrode support is titanium or titanium oxide, the electrode support and the metal or the metal oxide supported on the electrode support contain the same element (titanium). Thus, the electrode support can be produced through a production method including a catalyst forming step which will be described later, which is preferable.

A shape of the electrode support is not particularly limited and can be appropriately determined in accordance with the use of the electrode catalyst. The shape of the electrode support may be, for example, a sheet shape, a mesh shape, or a columnar shape, and when the electrode catalyst is utilized for the membrane electrode assembly, the shape is preferably a sheet shape or a mesh shape.

Metal or Metal Oxide Supported on Electrode Support

In the electrode catalyst in the embodiment, it is preferable that the metal or the metal oxide supported on the electrode support contain one or more kinds of a metal or a metal oxide, wherein the metal is selected from a transition metal and a typical metal in Groups 12 to 14. It is more preferable that the metal or the metal oxide supported on the electrode support be one or more kinds of metals or metal oxides selected from the group consisting of a transition metal in Groups 4 to 11 and a typical metal in Groups 12 to 14.

It is preferable that the metal or the metal oxide supported on the electrode support be specifically one or more metals or metal oxides selected from the group consisting of Co, Mo, Nb, Ni, V, W, Zr, and Ti. Among these, the metal or the metal oxide supported on the electrode support is preferably titanium or titanium oxide.

When the metal oxide is supported on the electrode support, it is preferable that the metal oxide is an oxide of a metal having the same element as the metal contained in the electrode support. It is preferable that the metal oxide be laminated on a surface of the metal contained in the electrode support.

Although a membrane thickness of a layer (including the layer even if the layer has an island shape in which the metal oxide is provided in this specification) composed of the metal oxide supported on the electrode support depends on the characteristics of the metal, the membrane thickness is a thickness corresponding to at least one layer of a metal oxide or more, or 0.1 nm or more; preferably 1 nm or more; and more preferably 2 nm or more. Furthermore, if the layer composed of the metal oxide is too thick, the resistance and overvoltage of the electrode catalyst will be too high. For this reason, a thickness of the metal oxide layer is 1000 nm or less, preferably 500 nm or less, and more preferably 100 nm or less.

When an oxide of a metal having the same element as the metal contained in the electrode support is supported on a surface of the metal-containing electrode support, a hydrogen generation reaction due to the electrochemical reduction of water is minimized due the oxide being supported. For this reason, the electrode catalyst becomes an electrode catalyst which enables the reductive amination reaction of the carbonyl compound to easily proceed selectively.

When the metal oxide is supported on the electrode support and the metal oxide contains an oxide of a metal having the same element as the metal contained in the electrode support, it is preferable that the metal oxide supported on the electrode support be further supported with fine particles of titanium oxide or fine particles of a titanium-containing metal oxide.

A size of the fine particles of titanium or a titanium-containing metal oxide is preferably 10 μm or less at the maximum, more preferably 1.5 μm or less, and still more preferably 1 μm or less. As the fine particles of titanium or the titanium-containing metal oxide, the smallest particles which can be technically produced can be utilized if the particles are on the nano-order.

It is preferable that the fine particles of titanium oxide or the titanium-containing metal oxide be composite oxides represented by the following Formula [1A]:

   TinMmOx   [1A].

(In Formula [1A], M is one or more metals selected from the group consisting of a transition metal and a typical metal in Groups 12 to 14; x is a value which satisfies an oxidation state of Ti and M; $0<n\leq1$, $0\leq m<1$, and $n+m=1$; and when m=0, Formula [1A] represents titanium oxide.)

In the composite oxide represented by Formula [1A], M is one or more metals selected from the group consisting of a transition metal and a typical metal in Groups 12 to 14.

When M is a transition metal, M is preferably one or more selected from the group consisting of a transition metal in the 4th or 5th period in Groups 3 to 11 and W. To be specific, M is preferably a transition metal selected from the group consisting of Y, Zr, V, Nb, Ta, Mo, W, Mn, Fe, Co, Ni, and Cu, more preferably from the group consisting of Nb, Fe, Ni, Co, Y, Mn, Cu, and Zr, and still more preferably from the group consisting of Nb, Fe, and Ni.

When M is a typical metal, M is preferably one or more selected from the group consisting of a typical metal in Group 12 and a typical metal in the 3$^{rd}$ or 4$^{th}$ period in Group 13. To be specific, M can include Al, Ga, Sn, and the like.

In the composite oxide represented by Formula [1A], the content of M is preferably smaller than the content of Ti. m is preferably 0.5 or less, and more preferably 0.3 or less.

It is preferable that a crystal structure of the composite oxide represented by Formula [1A] be an anatase type crystal structure. Particularly, when the composite oxide represented by Formula [1A] is titanium oxide, for example, it is preferable that the composite oxide be an anatase type titanium oxide rather than a rutile type titanium oxide.

In the electrode catalyst in the embodiment, when titanium oxide is supported on the electrode support, it is preferable that titanium oxide having an anatase type crystal structure be contained. Furthermore, it is preferable that titanium oxide having an anatase type crystal structure have a particle shape in which vertices and ridges are present at high density.

In the embodiment, among a plurality of crystal planes observed on a particle surface of titanium oxide having an anatase type crystal structure, each vertex in which three or more planes intersect is called a "vertex" and a line segment formed by the two intersections of the crystal planes is called a "ridge."

It is preferable that the titanium oxide particles in the electrode catalyst in the embodiment have a vertex density of $8.0\times10^{-4}$ nm$^{-2}$ or more per unit surface area or a vertex density of $7.0\times10^{-4}$ nm$^{-3}$ or more per unit volume and a ridge density of $5.0\times10^{-2}$ nm$^{-1}$ or more per unit surface area or a ridge density of $8.0\times10^{3}$ nm$^{-2}$ or more per unit volume.

In the embodiment, a particle shape of titanium oxide can be observed using a transmission electron microscope (TEM) image or a scanning electron microscope (SEM) image of titanium oxide.

For one particle of titanium oxide of interest, a polyhedral structure model is constructed by replacing the particle surface observed in the TEM image or the SEM image with some flat crystal planes and a length of the ridge and the like, a size of a polyhedron in a height direction, and the like are actually measured. From this, a surface area, a volume, the number of vertices, and the total length of the ridge can be obtained.

The vertex density per unit surface area or the vertex density per unit volume of the titanium oxide particles can be calculated by dividing the number of vertices obtained from the constructed structural model of one titanium oxide particle by the surface area or the volume.

Also, the ridge density per unit surface area or the ridge density per unit volume can be calculated by dividing the total length of the ridges obtained from the constructed structural model of one titanium oxide particle by the surface area or the volume.

Such a method can be utilized before or after the particles composed of titanium oxide in the embodiment are supported on the electrode support. Furthermore, such a method can be similarly applied to a porous material in which titanium oxide particles are grown on an electrode support.

Vertex Density

The titanium oxide in the embodiment have preferably a vertex density of $8.0\times10^{-4}$ nm$^{-2}$ or more, more preferably $2.0\times10^{-3}$ nm$^{-2}$ or more, still more preferably $1.0\times10^{-2}$ nm$^{2}$ or more, and particularly preferably $8.0\times10^{-2}$ nm$^{2}$ or more per unit surface area in one titanium oxide particle.

Also, in one titanium oxide particle, the vertex density per unit volume is preferably $7.0\times10^{-1}$ nm$^{3}$ or more, more preferably $1.0\times10^{-3}$ nm$^{3}$ or more, still more preferably $3.9\times10^{-1}$ nm$^{3}$ or more, and particularly preferably $1.0\times10^{-1}$ nm$^{-3}$ or more.

As the vertex density per unit surface area and the vertex density per unit volume increase, the function of promoting the reductive amination reaction of carboxyl group using titanium oxide improves. The tendency is the same regardless of when titanium oxide is supported on the electrode support or when titanium oxide is produced and grown on the electrode support.

Ridge Density

In the titanium oxide in the embodiment, a ridge density per unit surface area is preferably $5.0\times10^{-2}$ nm$^{-1}$ or more, more preferably $6.2\times10^{-2}$ nm$^{-1}$ or more, still more preferably $2.0\times10^{-1}$ nm$^{-1}$ or more, and particularly preferably $5.0\times10^{-1}$ nm$^{-1}$ or more in one titanium oxide particle.

Also, in one titanium oxide particle, the ridge density per unit volume is preferably $8.0\times10^{-3}$ nm$^2$ or more, more preferably $1.3\times10^{-2}$ nm$^2$ or more, still more preferably $7.6\times10^{-2}$ nm$^2$ or more, and particularly preferably $1.0\times10^{-1}$ nm$^{-2}$ or more.

When the ridge density per unit surface area and the ridge density per unit volume are within the above ranges, the function of promoting the reductive amination reaction of the carboxyl group using titanium oxide becomes remarkable. This tendency is the same regardless of when titanium oxide is supported on the electrode support or when titanium oxide is produced and grown on the electrode support.

In the electrode catalyst in the embodiment, the content of titanium oxide having the above-described specific vertex density is preferably 5% or more, more preferably 20% or more, still more preferably 50% or more, yet more preferably 90% or more, and particularly preferably 100% with respect to the total mass of titanium oxide.

Method for Producing Titanium Oxide

As a method for producing titanium oxide contained in the electrode catalyst in the embodiment, for example, a known method for producing titanium oxide having an anatase type crystal structure having a controlled shape (for example, reference literature: "Wu Qiang Wu, et al., 'Hierarchical Oriented Anatase TiO$_2$ nanostructure arrays on Flexible Substrate for Efficient Dye-sensitized Solar Cells,' Sci. Rep., 3:1892, 2013." and "Zhouyou Wang, et al., 'Study on the shape control and photocatalytic activity of high-energy anatase titania,' Appl. Catal. B, vol. 100, issues 1-2, p 378 to 385, 2010.") can be utilized.

To be specific, for example, first, ammonium halide (for example, ammonium fluoride and the like) is added to distilled water and stirred. Subsequently, tetraisopropyl orthotitanate is added to the mixture and stirred for 30 minutes or more and 1 hour or less. Subsequently, the obtained solution is transferred to a Teflon (registered trademark) container or the like and hydrothermally treated using a stainless autoclave or the like at, for example, 150° C. or higher and 250° C. or lower for 12 hours or more and 36 hours or less. Subsequently, the particles obtained through the hydrothermal treatment are washed with distilled water, acetone, or the like and the fine particles are recovered through centrifugation. Subsequently, the recovered particles are dried to provide anatase type titanium oxide with the specific vertex and ridge densities describe above.

Also, as a method for producing anatase type titanium oxide having the above-described specific vertex density and ridge densities, the method which will be described later may be utilized.

First, tetrabutyl orthotitanate is added to distilled water and the mixture is stirred for 30 minutes. The obtained solution is transferred to a Teflon (registered trademark) container or the like and hydrothermally treated using a stainless autoclave or the like at, for example, 150° C. or higher and 250° C. or less for 12 hours or more and 36 hours or less. Subsequently, the particles obtained through hydrothermal treatment are washed with distilled water, acetone, or the like and the fine particles are recovered through centrifugation. Subsequently, the recovered particles are dried.

The fine particles of the titanium-containing metal oxide such as the composite oxide represented by Formula [1A] contained in the electrode catalyst in the embodiment can be produced, for example, using the method which will be described later.

The compound containing the metal represented by M in Formula [1A] and the titanium compound are mixed at an arbitrary ratio, dissolved in a solvent, and caused to react under heating and pressurization using a solvothermal method (hydrothermal synthesis method).

As the compound containing the metal represented by M in Formula [1A], a metal chloride, a metal alkoxide, or the like can be utilized. As the titanium compound, titanium tetraisopropoxide or the like can be utilized. As the solvent, ethanol, acetone, and the like can be utilized, and it is preferable that the solvent be anhydrous.

A temperature at which the compound containing the metal represented by M and the titanium compound are caused to react is preferably 100° C. to 300° C. and more preferably 180° C. to 220° C. and can be appropriately selected depending on a type of the compound and the solvent used in the reaction and the like.

Subsequently, the reaction solution reacting through the solvothermal method is centrifuged. Moreover, the obtained precipitate is washed, dried, and calcined. The calcining of the precipitate is preferably performed at 400° C. to 600° C. and more preferably 450° C. to 550° C. When the calcining temperature is 500° C., a calcining time is preferably 2 hours after a temperature reaches the calcining temperature and more preferably 1 hour. The calcined product obtained through calcining is preferably rapidly cooled using a method for opening a calcining device after calcining.

A structure of the calcined product obtained in this way can be analyzed using a scanning electron microscope (SEM) and X-ray diffraction (XRD).

Method for Producing Electrode Catalyst

The electrode catalyst in the embodiment is a catalyst in which a metal or a metal oxide is supported on an electrode support composed of a conductive substance.

The electrode catalyst in the embodiment can be produced, for example, using a method for forming a structure composed of a metal or a metal oxide on a surface of the electrode support composed of a conductive substance.

Also, the electrode catalyst in the embodiment may be produced using a method for forming a structure composed of a metal or a metal oxide on a surface of an electrode support composed of a conductive substance and forming a layered or island-shaped structure composed of fine particles of the metal oxide on the surface of the metal or the metal oxide.

For example, when an electrode catalyst in which a metal oxide is supported on an electrode support is produced, the electrode catalyst can be produced using a method for synthesizing a metal oxide on the electrode support. For example, when an electrode catalyst in which the electrode support is composed of the metal is produced, the electrode catalyst can be produced using a method for calcining the electrode support in the air and forming a metal oxide on the electrode support.

Also, when an electrode catalyst in which fine particles of titanium or a titanium-containing metal oxide are further supported on the metal oxide supported on the electrode support is produced, the electrode catalyst can be produced using the method which will be described later. First, a metal oxide is synthesized on the electrode support using the above method. Subsequently, the metal oxide supported on the electrode support is coated with fine particles of titanium oxide or a titanium-containing metal oxide and the fine particles are calcined in the air. As a result, fine particles of titanium oxide or the titanium-containing metal oxide are supported on the metal oxide.

Furthermore, for example, when an electrode catalyst in which titanium oxide having the above-described anatase type crystal structure and having ridges and vertices is supported on the surface of the electrode support composed of the porous conductive substance is produced, the electrode catalyst can be produced using the method which will be described later.

For example, the electrode catalyst can be produced using a method for growing fine particles of titanium oxide having an anatase type crystal structure and having specific ridges and vertices on the surface of the electrode support. Furthermore, the electrode catalyst may be produced using a method for applying fine particles of titanium oxide having specific ridges and vertices onto the surface of the electrode support and calcining it.

Method for Growing Fine Particles of Titanium Oxide Having Anatase Type Crystal Structure and Specific Ridges and Vertices on Surface of Electrode Support As the method for growing fine particles of titanium oxide having an anatase type crystal structure on the surface of the electrode support and having specific ridges and vertices, a method in which a solvothermal method (hydrothermal synthesis method) is utilized is exemplified. To be specific, as will be described later, a method in which a catalyst forming step including a first hydrothermal reaction step using an alkaline solution, an ion exchange treatment step, and a second hydrothermal reaction step using water which are performed in this order is utilized is exemplified.

"First Hydrothermal Reaction Step"

The electrode support is subjected to a high temperature hydrothermal reaction under pressure using an alkaline solution (first hydrothermal reaction step). As the alkaline solution, for example, a solution containing sodium hydroxide, potassium hydroxide, ammonia, and the like can be used and the solution is not limited thereto. As a raw material, titanium and a titanium compound can be used, and it is preferable to use $H_2TiO_2$.

In the first hydrothermal reaction step, for example, an autoclave used for a high temperature reaction can be used as a reaction container. A reaction temperature in the first hydrothermal reaction step is preferably 150° C. or higher and 250° C. or lower, more preferably 200° C. or higher and 240° C. or lower, and still more preferably 220° C. or higher and 240° C. or lower. A reaction time in the first hydrothermal reaction step is preferably 3 hours or more and 72 hours or less, more preferably 6 hours or more and 48 hours or less, and still more preferably 12 hours or more and 48 hours or less.

If the reaction temperature and the reaction time in the first hydrothermal reaction step are within the above ranges, titanium which is a raw material of titanium oxide is sufficiently supported on the surface of the electrode support by performing the first hydrothermal reaction step.

"Ion Exchange Treatment Step"

Subsequently, the surface of the electrode support which has been subjected to the first hydrothermal reaction step is subjected to an ion exchange treatment using an acid solution (ion exchange treatment step). Examples of the acid solution include, but are not limited to, hydrochloric acid, sulfuric acid, nitric acid, and the like. It is preferable that the ion exchange treatment step be performed at a temperature of 15° C. or higher and 100° C. or lower and more preferably 20° C. or higher and 50° C. or lower. A treatment time in the ion exchange treatment step can be, for example, 10 minutes or more and 60 minutes or less and preferably 15 minutes or more and 45 minutes or less.

The electrode support containing titanium supported thereon which has been subjected to the ion exchange treatment step may be washed with water, ethanol, or the like and dried before subjected to a second hydrothermal reaction step.

"Second Hydrothermal Reaction Step"

Subsequently, the electrode support containing titanium supported thereon which has been subjected to the ion exchange treatment step is subjected to a hydrothermal reaction using water (second hydrothermal reaction step). A reaction temperature in the second hydrothermal reaction step is preferably 150° C. or higher and 250° C. or lower. A reaction time in the second hydrothermal reaction step is preferably 1 hour or more and 72 hours or less, more preferably 6 hours or more and 48 hours or less, and still more preferably 10 hours or more and 48 hours or less.

If the reaction temperature and the reaction time in the second hydrothermal reaction step are within the above ranges, when the second hydrothermal reaction step is performed, fine particles of titanium oxide having an anatase type crystal structure and having specific ridges and vertices are formed on the surface of the electrode support.

The electrode support (electrode catalyst) which has been subjected to the second hydrothermal reaction step may be washed with water, ethanol, or the like and dried.

When titanium oxide is grown on the surface of the electrode support through the method in which the catalyst forming step in which the first hydrothermal reaction step, the ion exchange treatment step, and the second hydrothermal reaction step are performed in this order is utilized, an electrode catalyst in which titanium oxide firmly bonds to the surface of the electrode support is obtained. The electrode catalyst obtained by such a production method can more effectively promote the reductive amination reaction of the carboxyl group.

Method for Supporting Oxide of Metal Having Same Element as Metal Contained in Electrode Support on Surface of Metal-Containing Electrode Support As a method for supporting an oxide of metal having the same element as the metal contained in the electrode support on the surface of the metal-containing electrode support, for example, as will be described later, a method for calcining a metal-containing electrode support in the air can be utilized. When this method is utilized, a metal-containing electrode support whose surface is coated with an oxide of a metal having the same element as the metal contained in the electrode support can be obtained.

The metal contained in the metal-containing electrode support is a metal which is oxidized when the metal is calcined in the air to form an oxide thereof and may be any of the above-described metals.

As a calcining furnace used for calcining the metal-containing electrode support, a furnace having a size in which the metal-containing electrode support can be loaded into the furnace is utilized. As the calcining furnace, a calcining tubular-path furnace can be utilized.

A calcining temperature of the metal contained in the metal-containing electrode support is, for example, preferably 100° C. to 900° C., more preferably 300° C. to 800° C., and still more preferably 450° C. to 770° C. and can be appropriately determined in accordance with a type of the metal. If the calcining temperature is 100° C. or higher, a layer composed of an oxide is formed on the surface of the metal-containing electrode support. If the calcining temperature is 900° C. or lower, it is possible to prevent the layer composed of an oxide from becoming too thick due to an excessive amount of oxide formed on the surface of the metal-containing electrode support.

Method for Supporting Fine Particles of Titanium Oxide or Titanium-Containing Metal Oxide on Surface of Electrode Support or on Metal or Metal Oxide Supported on Electrode Support As a method for supporting fine particles of titanium oxide or a titanium-containing metal oxide on the surface of the electrode support or the metal or the metal oxide (hereinafter may be referred to as "on a substrate" in some cases) supported on the electrode support, for example, as will be described later, a method in which a particle dispersion solution producing step, a coating step, and a calcining step are performed in this order is exemplified.

"Particle Dispersion Solution Producing Step"

In the particle dispersion solution producing step, fine particles of titanium oxide or a titanium-containing metal oxide are dispersed in a solvent through a known method to produce a particle dispersion solution.

It is preferable that the fine particles of titanium oxide or a titanium-containing metal oxide be composite oxides represented by the foregoing Formula [1A].

The solvent is not particularly limited as long as it does not impair the structure and the activity of fine particles of titanium oxide or a titanium-containing metal oxide. To be specific, as the solvent, for example, water, methanol, ethanol, or the like can be used.

It is preferable that the particle dispersion solution contain polyethylene glycol. When polyethylene glycol is provided, an electrode catalyst having excellent adhesion between the electrode support and fine particles of titanium oxide or a titanium-containing metal oxide can be obtained.

A concentration of fine particles of titanium oxide or a titanium-containing metal oxide contained in the particle dispersion solution can be, for example, 1% by mass or more and 90% by mass or less. If the concentration of the fine particles of the metal oxide is 1% by mass or more and 90% by mass or less, uniform coating of the particle dispersion solution is possible, which is preferable.

"Coating Step"

Subsequently, the electrode support is coated with the particle dispersion solution. As a method for coating a surface of the electrode support with the particle dispersion solution, a known coating method can be utilized and is not particularly limited. For example, in the coating step, a method for immersing the electrode support in the particle dispersion solution may be utilized.

When the method for immersing the electrode support in the particle dispersion solution is utilized, an immersion temperature is, for example, preferably 15° C. or higher and 90° C. or lower and more preferably 20° C. or higher and 50° C. or lower. An immersion time is preferably, for example, 1 minute or more and 60 minutes or less and more preferably 3 minutes or more and 30 minutes or less.

As an amount of particle dispersion solution to be coated, an amount of fine particles of titanium oxide or a titanium-containing metal oxide supported on a surface of the electrode support after the solvent has been removed is, for example, preferably an amount of 1 mg/cm$^2$ or more and 50 mg/cm$^2$ or less.

In the coating step, it is preferable to apply the surface of the electrode support with the particle dispersion solution and then remove the solvent from the electrode support using a known method.

"Calcining Step"

In the embodiment, the calcining step is performed after the coating step. When the calcining step is performed, the electrode support and fine particles of titanium oxide or a titanium-containing metal oxide can further adhere to each other.

A calcining temperature is, for example, preferably 100° C. or higher and 900° C. or lower and more preferably 250° C. or higher and 550° C. or lower.

A calcining time is, for example, preferably 10 minutes or more and 6 hours or less and more preferably 30 minutes or more and 5 hours or less.

Method of Using Electrode Catalyst

The electrode catalyst in the embodiment promotes the reductive amination reaction of carboxyl group. Therefore, the electrode catalyst in the embodiment has a function of reducing the imino group produced from the carbonyl compound and the nitrogen compound and promoting the production of the amine compound.

It is preferable that the electrode catalyst in the embodiment have an electrode support and titanium oxide supported on the electrode support. The electrode support may have, for example, a composite oxide in which some of titanium atoms of titanium oxide are replaced with specific elements to be supported, together with titanium oxide. When a structure in which a part of titanium atoms is replaced (doped) with one or more kinds of atoms is formed, a change in crystal structure and band structure, generation and transferring of carriers based on this (these contribute to a carrier concentration, mobility, conductivity, and the like) can be controlled, and a more preferred electrode catalyst is likely to be obtained. Such a composite oxide can be supported on the electrode support through a known method.

When the electrode support of the electrode catalyst in the embodiment contains a metal, a surface of the electrode catalyst may be covered with a metal oxide. The metal oxide may cover the entire electrode support or may partially cover the electrode support in a so-called island shape. An area covered with the metal oxide is preferably 80% or more and more preferably 90% or more of the electrode support. In addition, it is more preferable that the area covered with the metal oxide cover the entire electrode support. Such an electrode catalyst can be produced, for example, using a method for calcining a metal-containing electrode support in the air. When the surface of the metal-containing electrode support is covered with a metal oxide, a composite oxide of titanium oxide and/or titanium oxide may be supported on the metal oxide.

Membrane Electrode Assembly

The membrane electrode assembly in the embodiment will be described in detail below with reference to the drawings. In the embodiment, as an example of the membrane electrode assembly, the membrane electrode assembly for synthesizing an amine compound shown in FIG. 1 will be described as an example.

FIG. 1 is a schematic constitution diagram showing a membrane electrode assembly for synthesizing an amine compound in the embodiment. A membrane electrode assembly 100 for synthesizing an amine compound shown in FIG. 1 includes an anode 11, a cathode 10, and an electrolyte membrane 12 disposed between the anode 11 and the cathode 10. In other words, in the membrane electrode assembly 100 for synthesizing an amine compound in the embodiment, the cathode 10, the electrolyte membrane 12, and the anode 11 are laminated in this order.

As shown in FIG. 1, all of the anode 11, the cathode 10, and the electrolyte membrane 12 provided in the membrane electrode assembly 100 for synthesizing an amine compound are in the form of a membrane. In the membrane electrode assembly 100 for synthesizing an amine compound, the cathode 10 and the electrolyte membrane 12 bond to each other and the electrolyte membrane 12 and the anode 11 bond to each other. Thus, the cathode 10, the electrolyte membrane 12, and the anode 11 are integrated.

Cathode

As shown in FIG. 1, the cathode 10 in the embodiment includes an electrode support 2 and a support layer 1 composed of a metal or a metal oxide supported on the electrode support 2. In the membrane electrode assembly 100 for synthesizing an amine compound shown in FIG. 1, the electrode catalyst in the embodiment described above is provided as the cathode 10. Therefore, the electrode support 2 is an electrode support in the electrode catalyst in the embodiment. Furthermore, the support layer 1 is a metal or a metal oxide in the electrode catalyst in the embodiment.

Anode

As shown in FIG. 1, the anode 11 in the embodiment includes an electrode support 4 and a catalyst layer 3 supported on the surface of the electrode support 4. To be specific, a catalyst in which an oxide containing iridium oxide and tungsten oxide described in Patent Document 1 and PCT International Publication No. WO 2019/240200 is supported on an electrode support can be utilized.

The anode 11 in the embodiment may be produced using commercially available and known methods (for example, squeegee method (reference literature: S. Kitano, et al., "Bifunctionality of $Rh^{3+}$ Modifier on $TiO_2$ and Working Mechanism of $Rh^{3+}/TiO_2$ Photocatalyst under Irradiation of Visible Light," J Phys Chem C, vol. 117, p 11008 to 11016, 2013) and the like).

For example, first, a suspension is prepared by dispersing a catalyst in a solution containing water, an organic solvent, a surfactant, and the like. Subsequently, the suspension is dropped onto an electrode support. Subsequently, a glass rod placed at a position several tens of μm away from the surface of the electrode support is slid at a constant speed to spread the dropped suspension on a glass electrode substrate, and the suspension is uniformly applied. Subsequently, the calcining treatment is performed in an air atmosphere at a temperature of about 100° C. or higher and 700° C. or lower (heating rate: about 10° C./min) for 1 minute or more and 1440 minutes or less. The anode 11 is obtained through the above steps.

Electrolyte Membrane

The electrode membrane 12 in the embodiment functions as an ion exchange membrane configured to transfer protons between the anode 11 and the cathode 10.

A material of the electrolyte membrane 12 in the embodiment may be any material having proton conductivity and is not particularly limited. Specific examples of the material of the electrolyte membrane 12 include a conventionally known appropriate polymer membrane, an inorganic membrane, a composite membrane, and the like.

Examples of the polymer membrane used as the electrolyte membrane 12 include a perfluorosulfonic acid-based electrolyte membrane (Nafion (registered trademark): Dupont), Dow membrane (Dow Chemical), Aciplex (ACI-PLEX (registered trademark): Asahi Kasei Co., Ltd.), Flemion (Asahi Glass Co., Ltd.), hydrocarbon such as polystyrene sulfonic acid, sulfonated polyether ether ketone-based electrolyte membranes, and the like.

Examples of the inorganic membrane used as the electrolyte membrane 12 include glass phosphate, cesium hydrogen sulfate, polytangstric acid, ammonium polyphosphate, and the like.

Examples of the composite membrane used as the electrolyte membrane 12 include Gore Select membrane (Gore Select (registered trademark): manufactured by Gore Co., Ltd.) and the like.

Method for Producing Electrolyte Membrane

The electrolyte membrane 12 in the embodiment may be a commercially available membrane or may be produced through a known method.

Specific examples of the method for producing the electrolyte membrane 12 include methods which will be described later. First, a substrate or a support is coated with a coating solution composed of a resin composition containing components constituting the electrolyte membrane 12. Examples of the coating method of the coating solution include gravure coating, slot die coating, curtain coating, extrusion coating, air knife coating, slide coating, nip roll coating, immersion coating, kiss coating, rod bar coating, spray coating, and the like and is not limited to these. Subsequently, if necessary, the resin component in the resin composition is cured through heating or irradiation with ultraviolet rays. Curing conditions can be appropriately selected in accordance with the resin component contained in the resin composition. Subsequently, washing is performed using water or the like and a solvent or the like evaporates through calcining or the like. The electrolyte membrane 12 is obtained through the above steps.

Method for Producing Membrane Electrode Assembly

The membrane electrode assembly 100 for synthesizing an amine compound in the embodiment can be produced, for example, through a method which will be described later. First, the anode 11, the cathode 10, and the electrolyte membrane 12 are produced through the above production method. Moreover, a laminate is obtained by performing lamination so that the electrolyte membrane 12 is arranged between the catalyst layer 3 of the anode 11 and the catalyst layer 1 of the cathode 10. After that, the laminate is hot-pressed, for example, at 100° C. or higher and 200° C. or lower for about 2 minutes or more and 30 minutes or less. Through the above steps, the membrane electrode assembly 100 for synthesizing an amine compound is obtained.

Raw Material of Amine Compound

The electrode catalyst in the embodiment can be appropriately utilized when an amine compound is produced by reducing an imino group produced from a carbonyl compound and a nitrogen compound as raw materials.

As the carbonyl compound used for producing an amine compound in the embodiment, it is preferable to utilize an α-ketocarboxylic acid represented by the following Formula (11) in which a carbonyl group is present at an α-position of the carboxyl group. As the α-ketocarboxylic acid, an amine substituent capable of forming a cyclic structure with an α-carbonyl group in a molecule may be utilized.

When a desired amino acid is desired to be obtained, a corresponding raw material is selected from the following Formula (11), an imine (C=N) structure is generated together with a nitrogen compound which will be described later and reductive amination is performed using the electrode catalyst in the embodiment. This provides the desired amine compound.

Chemical Formula 8

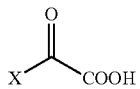

(11)

(In Formula (11), X is a hydrogen atom, or a substituent represent by a primary to tertiary class aliphatic hydrocarbon, an aromatic hydrocarbon having 6 to 20 carbon atoms, a vinyl group, a hydroxyl group, an ether, a thiol, a thioether, a phosphonic acid, a phosphonic acid ester, a phosphinic acid, or a phosphinic acid ester.)

In Formula (11), X may be a primary to tertiary aliphatic hydrocarbon represented by the following Formula (12):

$$—CR_1R_2R_3 \quad (12).$$

(In Formula (12), $R_1R_2R_3$ is any of the following (a12) to (c12):

(a12) All are hydrogen.

(b12) $R_1$ is hydrogen atoms; $R_2R_3$ is hydroxyl groups, methyl groups, aliphatic hydrocarbons having 1 to 20 carbon atoms which may have substituents, aromatic hydrocarbons having 6 to 20 carbon atoms which may have substituents, heteroaromatic hydrocarbon groups having 6 to 20 carbon atoms which may have substituents, aromatic hydrocarbons having 6 to 20 carbon atoms which may have substituents, and heteroaromatic hydrocarbon groups having 6 to 20 carbon atoms which may have substituents; the substituents include substituents which are represented by carboxyl groups, amide groups, vinyl groups, hydroxyl groups, ether groups, thiol groups, thioether groups, phosphonic acid groups, phosphonic acid ester groups, phosphinic acid groups, phosphinic acid ester groups, amino groups, alkylamino groups, or guanidine groups; and $R_2$ and $R_3$ are substituents which may be the same or different from each other and may form a ring.

(c12) $R_1R_2$ is hydrogen atoms; $R_3$ is represented by aliphatic hydrocarbons having 1 to 20 carbon atoms which may have substituents, aromatic hydrocarbons having 6 to 20 carbon atoms which may have substituents, and heteroaromatic hydrocarbon groups having 6 to 20 carbon atoms which may have substituents; the substituents include substituents which are represented by carboxyl groups, amide groups, vinyl groups, hydroxyl groups, ether groups, thiol groups, thioether groups, phosphonic acid groups, phosphonic acid ester groups, phosphinic acid groups, phosphinic acid ester groups, amino groups, alkylamino groups, or guanidine groups; and $R_3$ may form a ring or may be ringed with α-carbonyl groups.)

In Formula (12), when $R_3$ can form a C=N bond by winding a ring with an α-carbonyl group, reductive amination can be performed using the electrode catalyst in the embodiment.

In the embodiment, examples of the nitrogen compound used in the production of the amine compound include ammonia and/or hydroxylamine (a nitrogen compound capable of supplying ammonia and/or hydroxylamine in a solution). As the nitrogen compound, it is preferable to utilize hydroxylamine in consideration of ease of handling.

When the reductive amination reaction is performed using the carbonyl compound and the hydroxylamine as raw materials while applying a voltage in the presence of the electrode catalyst in the embodiment, the amine compound can be produced with even higher Faraday efficiency.

When the reductive amination reaction is performed using the carbonyl compound and the nitrogen compound as raw materials and using the electrode catalyst in the embodiment, the amino acid represented by the following Formula (13) can be obtained.

Chemical Formula 9

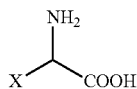

(13)

(In Formula (13), X is a hydrogen atom, or a substituent represent by a primary to tertiary class aliphatic hydrocarbon, an aromatic hydrocarbon having 6 to 20 carbon atoms, a vinyl group, a hydroxyl group, an ether, a thiol, a thioether, a phosphonic acid, a phosphonic acid ester, a phosphinic acid, or a phosphinic acid ester.)

In Formula (13), X may be a primary to tertiary aliphatic hydrocarbon represented by the following Formula (14):

$$CR_1R_2R_3 \quad (14).$$

(In Formula (14), $R_1R_2R_3$ is any of the following (a14) to (c14):

(a14) All are hydrogen.

(b14) $R_1$ is hydrogen atoms; $R_2R_3$ is hydroxyl groups, methyl groups, aliphatic hydrocarbons having 1 to 20 carbon atoms which may have substituents, aromatic hydrocarbons having 6 to 20 carbon atoms which may have substituents, heteroaromatic hydrocarbon groups having 6 to 20 carbon atoms which may have substituents, aromatic hydrocarbons having 6 to 20 carbon atoms which may have substituents, and heteroaromatic hydrocarbon groups having 6 to 20 carbon atoms which may have substituents; the substituents include substituents which are represented by carboxyl groups, amide groups, vinyl groups, hydroxyl groups, ether groups, thiol groups, thioether groups, phosphonic acid groups, phosphonic acid ester groups, phosphinic acid groups, phosphinic acid ester groups, amino groups, alkylamino groups, or guanidine groups; and $R_2$ and $R_3$ are substituents which may be the same or different from each other and may form a ring.

(c14) $R_1R_2$ is hydrogen atoms; $R_3$ is represented by aliphatic hydrocarbons having 1 to 20 carbon atoms which may have substituents, aromatic hydrocarbons having 6 to 20 carbon atoms which may have substituents, and heteroaromatic hydrocarbon groups having 6 to 20 carbon atoms which may have substituents; the substituents include substituents which are represented by carboxyl groups, amide groups, vinyl groups, hydroxyl groups, ether groups, thiol groups, thioether groups, phosphonic acid groups, phosphonic acid ester groups, phosphinic acid groups, phosphinic acid ester groups, amino groups, alkylamino groups, or guanidine groups; and $R_3$ may form a ring or may be ringed with α-amino groups.)

The amino acid in which X in the amino acid represented by Formula (13) is hydrogen is glycine. The amino acid in which X in the amino acid represented by Formula (13) is (a14) in Formula (14), that is, the primary carbon is alanine. Examples of the amino acid (b14) in Formula (14), that is, the secondary carbon, include theronine, isoleucine, and valine. (c14) in Formula (14) is an amino acid in which the carbon of an α side chain of the amino acid is a methylene group, followed by a methylene group, an aromatic group, and other functional groups. Examples of such amino acids include leucine, histidine, lysine, aspartic acid, asparagine, glutamic acid, glutamine, cysteine, serine, tyrosine, methionine, arginine, lysine, and phenylalanine. Furthermore, when the above-described ring-wound imine structure can be formed, a cyclic amino acid having a ring-wound with an α-amino group can be obtained. Examples of such amino acids include proline.

Although the examples described above have been described with the example of amino acids constituting proteins, in reality, amino acids are not limited to this example. When the above α-ketocarboxylic acid and nitrogen compound are selected, various α-amino acids can be synthesized.

The inventors of the present invention investigated a mechanism by which the reductive amination of the imine (C=N) structure can be performed using the electrode catalyst in the embodiment. As a result, although the mechanism is not associated with a specific mechanism, it is considered that one of them is that the C=N bond portion is close to the catalyst in which electron transfer and proton transfer occur to cause a reduction reaction. If so, the C=N bond portion needs to be in close proximity to the catalyst. Therefore, it was expected that steric hinderance around the C=N bond wound have an effect.

However, according to examples which will be described later, valine and isoleucine (a14) whose a side chain is a secondary carbon may have a slightly lower Faraday efficiency than valine (b14), leucine (c14), glycine (H), and alanine (a14), but similar performance of amino acid synthesis can be obtained. Furthermore, with regard to the production of amino acids in which at least one methylene group is present in the α side chain represented by (c14), even if the amino acid is an amino acid having a large function group at the tip of the methylene group, for example, an amino acid having an aromatic ring (tyrosine or phenylalanine) or an amino acid having a functional group such as a carboxyl group (glutamic acid), it is considered that there is no significant effect on the reaction.

From the above, the electrode catalyst in the embodiment can correspond to the synthesis of all α-amino acids.

Method for Producing Amine Compound

A method for producing an amine compound in the embodiment will be described in detail below with reference to the drawings. The method for producing an amine compound in the embodiment is a method for producing an amine compound using an electrochemical cell including an anode and a cathode provided therein.

In the embodiment, a case in which an amine compound is produced using the amine compound synthesizing device shown in FIG. 2 as an electrochemical cell will be described as an example.

Figure 2:
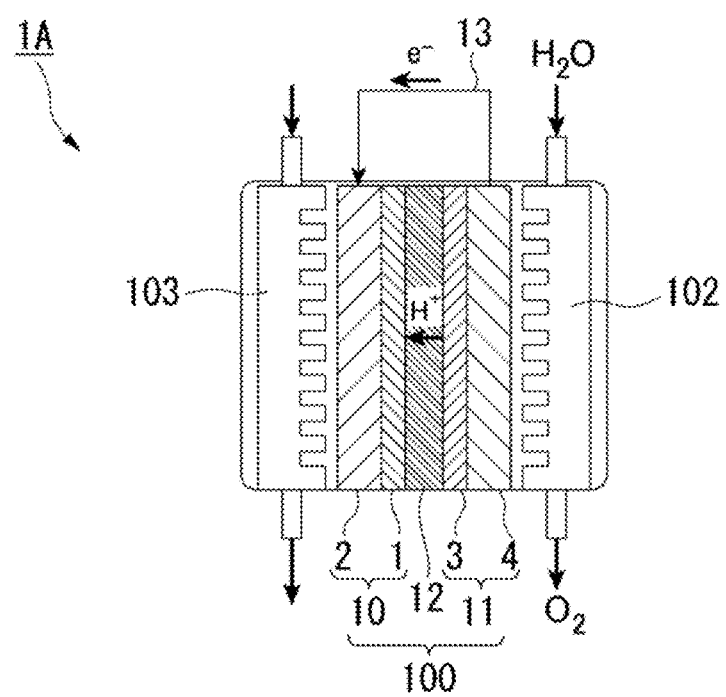
FIG. 2 is a schematic constitution diagram showing an example of an amine compound synthesizing device.
Figure 22:
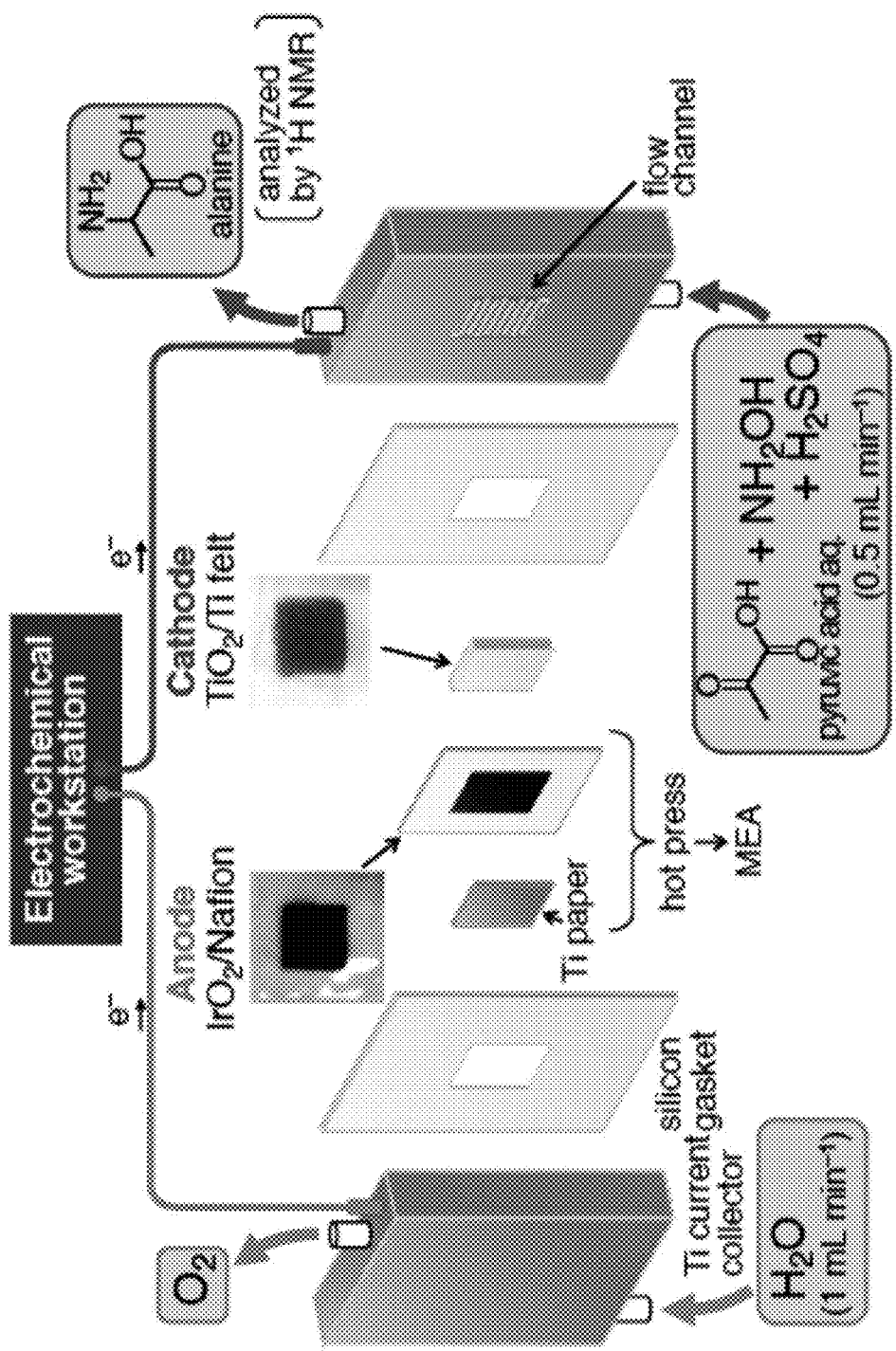
FIG. 22 is a three-dimensional diagram of a membrane electrode assembly 100 for synthesizing the amine compound shown in FIG. 2.

FIG. 2 is a schematic constitution diagram showing an example of the amine compound synthesizing device. FIG. 22 shows a three-dimensional representation of the membrane electrode assembly 100 for synthesizing an amine compound shown in FIG. 2.

An amine compound synthesizing device 1A shown in FIG. 2 includes the membrane electrode assembly 100 for synthesizing an amine compound shown in FIG. 1, a first supply device 102, and a second supply device 103.

The first supply device 102 supplies water or steam which is a raw material to the anode 11. The second supply device 103 supplies a carbonyl compound and a nitrogen compound which are raw materials to the cathode 10.

Also, as shown in FIG. 2, the cathode 10 and the anode 11 in the membrane electrode assembly 100 for synthesizing an amine compound are electrically connected through a conducting wire 13 and electrons can be supplied from the anode 11 to the cathode 10.

In order to produce an amine compound using the amine compound synthesizing device 1A shown in FIG. 2, water or steam which is a raw material is supplied from a flow cell of the first supply device 102 to the anode 11. Furthermore, a carbonyl compound and a nitrogen compound which are raw materials are supplied from the flow cell of the second supply device 103 to the cathode 10. Moreover, a voltage is supplied between the anode 11 and the cathode 10. This produces an amine compound as will be described later.

That is to say, water is decomposed to generate protons on the catalyst layer 3 of the anode 11 of the membrane electrode assembly 100 for synthesizing an amine compound. The generated protons pass through the electrolyte membrane 12 and reach the support layer 1 of the cathode 10. Thus, a reductive amination reaction in which a carbonyl compound and a nitrogen compound are used as raw materials occurs on the support layer 1 of the cathode 10 and an amine compound is produced.

In the method for producing an amine compound in the embodiment, it is preferable to produce an amino acid as an amine compound. In this case, it is preferable to supply an α-keto acid or a carboxylic acid as a carbonyl compound to the cathode 10 and it is more preferable to supply an α-keto acid. As the carboxylic acid, it is preferable to utilize a derivative of an α-keto acid, and for example, a two-electron oxidized derivative of an α-keto acid can be utilized. Furthermore, as the nitrogen compound, it is preferable to supply ammonia or hydroxylamine (a nitrogen compound capable of supplying ammonia and/or hydroxylamine in a solution) and it is more preferable to supply hydroxylamine.

Also, in the method for producing an amine compound in the embodiment, as an α-keto acid, an an α-keto acid produced by oxidizing or reducing a carbonyl compound may be utilized. In this case, it is preferable to have a step of producing an α-keto acid by oxidizing or reducing a carbonyl compound through a known method. The step of producing an α-keto acid by oxidizing or reducing a carbonyl compound may be performed in the amine compound synthesizing device 1A or in a device different from the amine compound synthesizing device 1A.

Furthermore, when an amino acid is produced as an amine compound, in order to efficiently produce an amino acid, it is preferable to use 0.01 to 1000 equivalents of ammonia or 0.01 to 1000 equivalents of hydroxylamine with respect to 1 equivalent of an α-keto acid and 20 to 100 equivalents of ammonia, or it is more preferable to use 1 to 1.2 equivalents of hydroxylamine.

In the method for producing an amine compound in the embodiment, for example, when an α-keto acid and ammonia or hydroxylamine is supplied to the cathode 10, water or steam is supplied to the anode 11, and a voltage is applied between the anode 11 and the cathode 10, the following reaction occurs at the anode 11 and the cathode 10.

For example, when ammonia is supplied as a nitrogen compound, the following reaction occurs at the cathode 10:

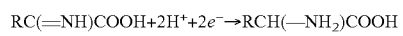

(R in the Formula represents a hydrogen atom, a substituted or unsubstituted alkyl group having 1 to 30 carbon atoms, or a substituted or unsubstituted aryl group. When an amino acid is produced as an amine compound, R in the Formula indicates a side chain of the amino acid.)

For example, when hydroxylamine is supplied as a nitrogen compound, the following reaction occurs at the cathode 10:

$$RC(=NOH)COOH + 4H^+ + 4e^- \rightarrow RCH(-NH_2)COOH + H_2O$$

(R in the Formula represents a hydrogen atom, a substituted or unsubstituted alkyl group having 1 to 30 carbon atoms, or a substituted or unsubstituted aryl group. When an amino acid is produced as an amine compound, R in the Formula indicates a side chain of the amino acid.)

Also, the following reaction occurs at the anode 11:

$$2H_2O \rightarrow 4H^+ + 4e^- + O_2.$$

In the method for producing an amine compound in the embodiment, an amino acid is synthesized through the above reductive amination reaction.

Furthermore, in the method for producing an amine compound in the embodiment, it is preferable to supply raw materials from the flow cells to each of the anode 11 and the cathode 10, separately. Thus, each amount of raw materials supplied to the anode 11 and the cathode 10 can be accurately controlled and the yield of the amine compound can be improved.

In the method for producing an amine compound in the embodiment, when ammonia is supplied as a nitrogen compound, pH of raw materials supplied to the cathode 10 is preferably 0.1 to 10 and more preferably 7 to 10. When ammonia is used as the nitrogen compound, pH of the raw materials supplied to the cathode 10 are within the above ranges, and the reductive amination reaction of α-keto acids is performed, a concentration of ammonia in the raw materials becomes appropriate and the production of imine which is a reaction intermediate is promoted. Thus, an amino acid can be produced in high yield.

In the method for producing an amine compound in the embodiment, when ammonia is supplied as a nitrogen compound, a temperature of the anode 11 and the cathode 10 are preferably 0° C. to 100° C. and more preferably 35° C. to 45° C. When the temperature of the anode 11 and the cathode 10 is set within the above ranges, a sufficient reaction rate can be obtained and an amine compound can be produced in excellent yield.

In the method for producing an amine compound in the embodiment, when hydroxylamine is supplied as a nitrogen compound, pH of raw materials supplied to the cathode 10 is preferably 0 to 4 and more preferably 0 to 2. When hydroxylamine is utilized as a nitrogen compound and pH of the raw materials supplied to the cathode 10 is within the above ranges, the decomposition of hydroxylamine in the raw materials is minimized so that the yield of the amine compound can be improved.

In the method for producing an amine compound in the embodiment, when hydroxylamine is supplied as a nitrogen compound, a temperature of the anode 11 and the cathode 10 is preferably 0° C. to 100° C. and more preferably 0° C. to 10° C. When the temperature of the anode 11 and the cathode 10 is set within the above ranges, the hydrogen generation reaction which competes with the target reaction on the cathode 10 can be minimized and the yield of the amine compound can be improved.

Also, since water or steam is supplied to the anode 11, an amine compound can be provided with a small environmental load, which is preferable.

In the method for producing an amine compound in the embodiment, the above reactions occur at the anode 11 and the cathode 10. As a result, oxygen is discharged from the first supply device 102 of the amine compound synthesizing device 1A shown in FIG. 2 and the amine compound is discharged from the second supply device 103.

The electrode catalyst in the embodiment may include an electrode support composed of a porous conductive substance and titanium oxide supported on the electrode support and the titanium oxide may have an anatase type crystal structure and has a ridges and vertices. In this case, the electrode catalyst can be formed only from non-toxic materials having a large amount of resources.

Also, the electrode catalyst in the embodiment has a function of promoting the reductive amination reaction of the carboxyl group and promoting the production of the amine compound through the reductive amination reaction using the carbonyl compound and the nitrogen compound as raw materials. For this reason, when the reductive amination reaction using the carbonyl compound and the nitrogen compound as raw materials is performed in the presence of the electrode catalyst in the embodiment, an amine compound can be produced without using harmful substances and precious metals with a small amount of resources.

Furthermore, in the method for producing an amine compound in the embodiment, an electrochemical cell in which the electrode catalyst in the embodiment is provided on the cathode 10 is utilized. For this reason, when a carbonyl compound and a nitrogen compound are supplied to the cathode 10 and a voltage is applied between the anode 11 and the cathode 10, an amine compound can be produced without using harmful substances and precious metals with a small amount of resources.

In addition, since the membrane electrode assembly 100 for synthesizing an amine compound in the embodiment includes the electrode catalyst in the embodiment at the cathode 10, the membrane electrode assembly 100 for synthesizing an amine compound can be suitably utilized when an amine compound is produced through a reductive amination reaction.

In the above-described embodiment, as an example of the method for producing an amine compound in the embodiment, although a case in which an amine compound is produced using the amine compound synthesizing device 1A shown in FIG. 2 has been described as an example, in the method for producing an amine compound in the present invention, an electrochemical cell including an anode and a cathode having the electrode catalyst in the present invention provided thereon may be utilized and the present invention is not limited to the example in which the amine compound synthesizing device 1A shown in FIG. 2 is used.

For example, shapes of the anode and the cathode of the electrochemical cell are not particularly limited and may be a plate shape or a rod shape. Furthermore, the electrolyte membrane may or may not be provided as needed.

EXAMPLES

Although the present invention will be described in more detail below with reference to examples, the present invention is not limited to these examples.
Measurement Method and Evaluation Method
Items which will be described later were measured and evaluated using methods which will be described later.
pH Measurement
A pH of an electrolyte solution was measured using D-51 manufactured by HORIBA, Ltd.
Scanning Electron Microscope (SEM) Observation
As a scanning electron microscope, JSM7900F manufactured by JEOL Ltd. was used.

X-Ray Diffraction (XRD)

As an X-ray diffractometer, a tabletop powder X-ray diffractometer (D2PHASER/SP2) manufactured by BRUKER was used. CuKα rays (λ=1.5406 Å) were used for X-ray diffraction measurement.

Nuclear Magnetic Resonance (NMR) Measurement

As an NMR device, $^1$H NMR was measured using Avance III (manufactured by Bruker; external magnetic field of 600 MHz).

Field Emission Scanning Electron Microscope (EDS) Analysis

As a field emission scanning electron microscope device, an atomic number ratio on a catalyst surface of a metal was obtained using JSM-7900F (manufactured by JEOL Ltd.).

Electrochemical Cell Used for CV Measurement

Figure 3:
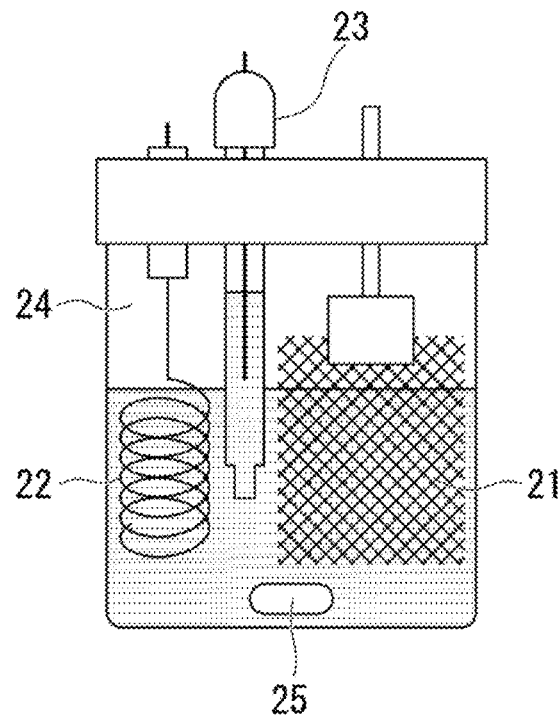
FIG. 3 is a schematic constitution diagram for explaining an electrochemical cell used for measuring CV characteristics.

FIG. 3 is a schematic constitution diagram for explaining an electrochemical cell used for CV measurement.

In FIG. 3, a working electrode is denoted by reference numeral 21, a counter electrode is denoted by reference numeral 22, and a reference electrode is denoted by reference numeral 23. An electrode catalyst to be evaluated was installed on the working electrode 21. As the counter electrode 22, a platinum coil (manufactured by BAS) having a diameter of 0.5 mm and a length of 23 cm was used. As the reference electrode 23, an Ag/AgCl electrode (RE-1B: manufactured by BAS) was used. Furthermore, VersaSTAT4 manufactured by Princeton Applied Research was used as a potentiostat.

In a chamber 24 of the electrochemical cell shown in FIG. 3, as a blank, 50 mL of an electrolyte solution containing a 0.2 mol/L sulfuric acid aqueous solution (pH of 0.62) was input and the mixture was subjected to argon bubbling for about 30 minutes and subjected to degassing. Subsequently, CV measurement was performed at a sweep rate of 0.01 Vsec$^{-1}$ by setting a measurement potential in a range of −1.2 V to 0 V (vs. reversible hydrogen electrode (RHE)) at room temperature while stirring the electrolyte solution using a stirrer 25.

Subsequently, the electrode catalyst to be evaluate was installed as the working electrode of the electrochemical cell shown in FIG. 3, and as an electrolyte solution, an oxalic acid-containing solution (sulfuric acid solution containing 160 mmol/L of oxalic acid (0.2 mol/L, using pH of 0.51)) and a sulfuric acid hydroxylamine-containing solution (sulfuric acid aqueous solution containing 80 mmol/L of hydroxylamine sulfate (0.2 mol/L, pH of 0.66)) were used and CV measurement was performed in the same manner as when the electrode solution is blank.

Electrochemical Cell Used for Producing Amino Acid

Figure 16:
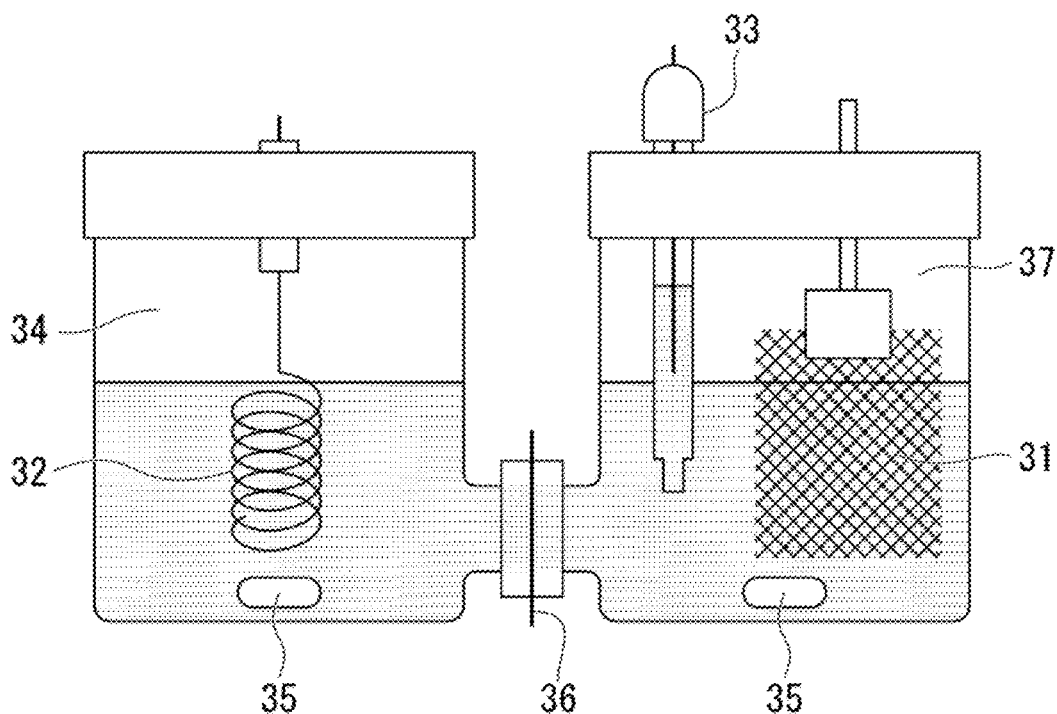
FIG. 16 is a schematic constitution diagram for explaining an electrochemical cell used for producing an amino acid.

An amino acid was produced using the electrochemical cell shown in FIG. 16.

FIG. 16 is a schematic constitution diagram for explaining an electrochemical cell used for producing an amino acid. The electrochemical cell shown in FIG. 16 is a two-chamber electrochemical cell partitioned using a cation exchange membrane. In FIG. 16, a working electrode is denoted by reference numeral 31, a counter electrode is denoted by reference numeral 32, a reference electrode is denoted by reference numeral 33, and a cation exchange membrane is denoted by reference numeral 36.

As the working electrode 31, an electrode catalyst to be evaluated was installed. As the counter electrode 32, a platinum coil (manufactured by BAS) having a diameter of 0.5 mm and a length of 23 cm was used. As the reference electrode 33, an Ag/AgCl electrode (RE-1B; manufactured by BAS) was used. As the cation exchange membrane 36, Nafion (registered trademark) NRE-212 was used.

Also, as the potentiostat, VersaSTAT4 manufactured by Princeton Applied Research Co., Ltd. was used. As a magnetic stirrer, a stirrer whose temperature can be adjusted was used. Furthermore, before a reaction, a solution in a chamber 37 on the working electrode 31 side and a buffer solution in a chamber 34 on the counter electrode 32 side were subjected to argon bubbling for about 30 minutes and subjected to degassing.

α-Keto Acid Conversion Rate

An α-keto acid concentration in the solution in the chamber 37 on the working electrode 31 side which has been subjected to the constant potential electrolysis (CA) was measured using a high performance liquid chromatograph (HPLC) (trade name: Prominence; manufactured by Shimadzu Corporation). The HPLC measurement was performed using Shodex KC-811 (manufactured by Showa Denko KK) as a column, a 50 mmol/L HClO$_4$ aqueous solution as an eluate, and a flow rate of 1 ml/min.

Also, an α-keto acid concentration in the solution in the chamber 37 on the working electrode 31 side which has been subjected to the constant potential electrolysis (CA) was calculated using an area of a peak derived from an α-keto acid in the obtained chromatogram and a calibration curve created separately using standard data.

After that, an α-keto acid conversion rate was calculated through the following Formula (A) using the calculated α-keto acid concentration and the α-keto acid concentration in the chamber 37 on the working electrode 31 which has not been subjected to the constant potential electrolysis (CA):

$$\text{Conversion rate of α-keto acid (\%)} = \{(N_{keto0} - N_{keto})/N_{keto0}\} \times 100 \quad \text{(A)}.$$

(In Formula (A), $N_{keto0}$ indicates an amount of substance (mol) of an α-keto acid which has not been subjected to the constant potential electrolysis and $N_{keto}$ indicates an amount of substance (mol) of an α-keto acid which has been subjected to the constant potential electrolysis.)

Amino Acid Yield

The solution in the chamber 37 on the working electrode 31 side which has been subjected to the constant potential electrolysis (CA) was diluted 5-fold with heavy water to prepare a sample for nuclear magnetic resonance (NMR) measurement. $^1$H NMR measurement of the sample for NMR measurement was performed using an NMR device (Avance III; manufactured by Bruker). Moreover, in a spectrum obtained through the NMR measurement, an amino acid concentration in the solution in the chamber 37 on the working electrode 31 which has been subjected to the constant potential electrolysis (CA) using an area of a signal derived from protons on an α carbon of the amino acid appearing in the vicinity of 3.4 ppm to 3.8 ppm and a calibration curve created separately using standard data.

After that, a yield of an amino acid was calculated through the following Formula (B) using the calculated amino acid concentration:

$$\text{Yield of amino acid (\%)} = (N_{amino}/N_{keto0}) \times 100 \quad \text{(B)}.$$

(In Formula (B), $N_{keto0}$ indicates an amount of substance (mol) of an α-keto acid which has not been subjected to the constant potential electrolysis and $N_{amino}$ indicates an amount of substance (mol) of amino acid which has been subjected to the constant potential electrolysis.)

Faraday Efficiency of Amino Acid Production

A Faraday efficiency of amino acid production was calculated through the following Formula (D) using the amino acid concentration in the solution in the chamber 37 on the working electrode 31 side which has been subjected to the constant potential electrolysis (CA):

Faraday efficiency of amino acid production (%)={(2×$N_{amino}$×F)/Q}×100    (D).

(In Formula (D), $N_{amino}$ indicates an amount of substance (mol) of an amino acid which has been subjected to the constant potential electrolysis, F indicates the Faraday's constant (96500 C/mol), and Q indicates an amount of electric charges (C) which has flowed between the working electrode and the counter electrode during constant potential electrolysis).

Example 1: Titanium Mesh Having Titanium Oxide Supported Thereon

A titanium mesh (twill weave, 100 mesh; manufactured by Manabe Kogyo Co., Ltd.) was cut into a rectangle having a length of 20 mm and a width of 25 mm. The cut titanium mesh was ultrasonically cleaned in hexane and ethanol for 5 minutes to remove oil on the surface and dried to obtain an electrode support for the electrode catalyst.

Subsequently, a catalyst forming step of growing and forming titanium oxide from the surface of the titanium mesh as the electrode support was performed. As the catalyst forming step, as will be described later, a first hydrothermal reaction step, an ion exchange treatment step, and a second hydrothermal reaction step were performed in this order.

The titanium mesh was introduced into an inner cylinder type pressure-resistant sealed container made of Teflon (registered trademark) together with 30 mL of a 1 mol/L NaOH aqueous solution, sealed, heated at 220° C. for 12 hours, and cooled to room temperature (first hydrothermal reaction step). After that, the titanium mesh was taken out from the container and washed with a 0.1 mol/L HCl aqueous solution and ion-exchanged water at a temperature of 25° C. for 15 minutes to obtain a titanium mesh covered with $H_2Ti_2O_5 \cdot H_2O$ (ion exchange treatment step).

Subsequently, the titanium mesh covered with $H_2Ti_2O_5 \cdot H_2O$ was introduced in an inner cylinder type pressure-resistant sealed container made of Teflon (registered trademark) together with 40 mL of ion-exchanged water, sealed, heated at 200° C. for 24 hours, and heated to room temperature (second hydrothermal reaction step). After that, the titanium mesh was removed from the container, washed with ion-exchanged water and ethanol, and dried. Through the above steps, the electrode catalyst in Example 1 was obtained.

The electrode catalyst in Example 1 was observed using a scanning electron microscope image (SEM). As a result, it was confirmed that titanium oxide having ridges and vertices were grown and formed on the surface of the titanium mesh as the electrode support.

Also, X-ray diffraction (XRD) was performed on the electrode catalyst in Example 1. As a result, it was confirmed that the titanium oxide grown and formed on the surface of the titanium mesh as the electrode support has an anatase type crystal structure.

Figure 4:
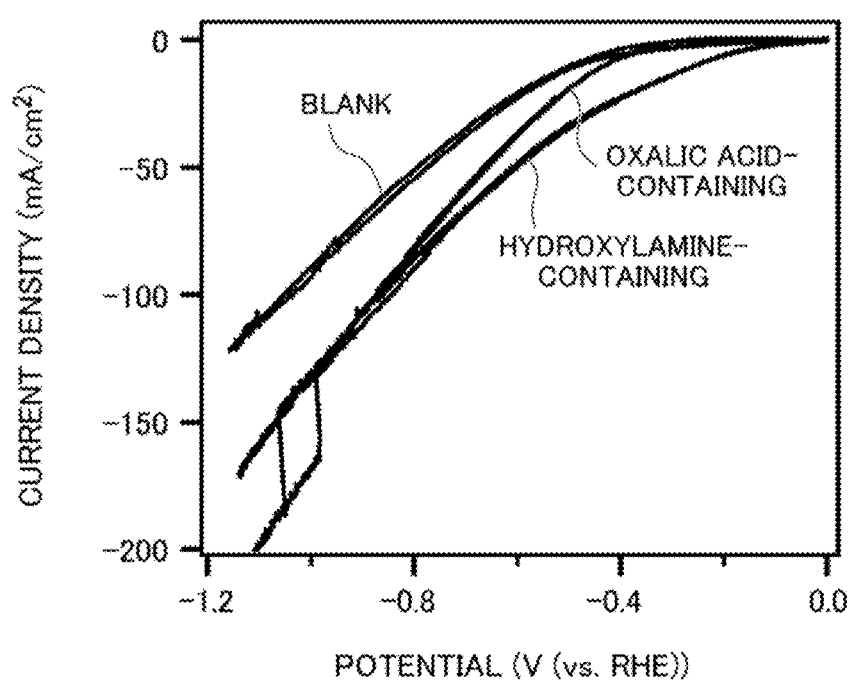
FIG. 4 is a graph for describing a CV measurement result in Example 1.

The electrode catalyst in Example 1 was installed as the working electrode of the electrochemical cell shown in FIG. 3 and CV measurement was performed using a blank (sulfuric acid aqueous solution; pH of 0.62), an oxalic acid-containing solution (sulfuric acid solution containing 160 mmol/L of oxalic acid (0.2 mol/L, pH of 0.51)), and a hydroxylamine sulfate-containing solution (sulfuric acid aqueous solution containing 80 mmol/L of hydroxylamine sulfate (0.2 mol/L, pH of 0.66)) as an electrolyte solution. The results are shown in FIG. 4. Table 1 shows the measurement results of a current density (mA/cm$^2$) at a potential of –0.5 V (vs. RHE).

Example 2: Aluminum Plate Having Aluminum Oxide Supported Thereon

A metal plate (manufactured by Nirako Co., Ltd.) made of Al having a thickness of 0.1 mm was cut into a rectangle having a length of 20 mm and a width of 25 mm. The cut Al metal plate was ultrasonically cleaned in hexane and ethanol for 5 minutes to remove oil on the surface and dried. The dried Al metal plate was put into a tubular furnace having a diameter of 2.5 cm and calcined by heating at 450° C. for 2 hours while flowing air into the tubular furnace at a flow rate of 1 atm and 60 ccm (cm$^3$ min$^{-1}$). After calcining, the Al metal plate was cooled to room temperature and taken out from the tubular furnace. Through the above steps, the electrode catalyst in Example 2 was obtained.

Figure 5:
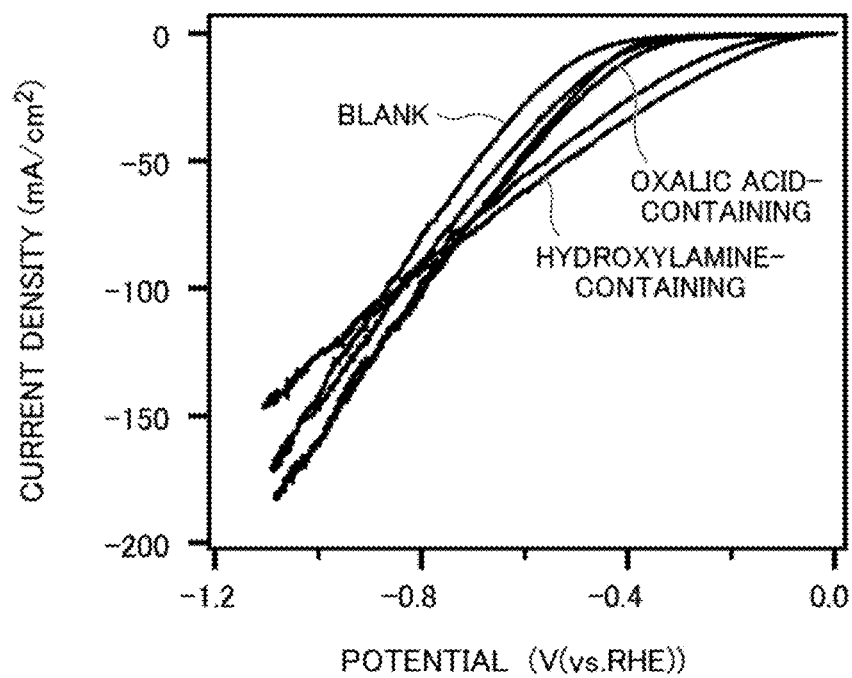
FIG. 5 is a graph for describing a CV measurement result in Example 2.

The electrode catalyst in Example 2 was installed as the working electrode of the electrochemical cell shown in FIG. 3 and CV measurement was performed in the same manner as in Example 1. The results are shown in FIG. 5. Furthermore, Table 1 shows the measurement results of a current density (mA/cm$^2$) at a potential of –0.5 V (vs. RHE).

Example 3: Cobalt Plate Having Cobalt Oxide Supported Thereon

An electrode catalyst in Example 3 was produced in the same manner as in Example 2 except that a metal plate made of Co having a thickness of 0.1 mm (manufactured by Niraco Co., Ltd.) was used instead of the metal plate made of Al.

Figure 6:
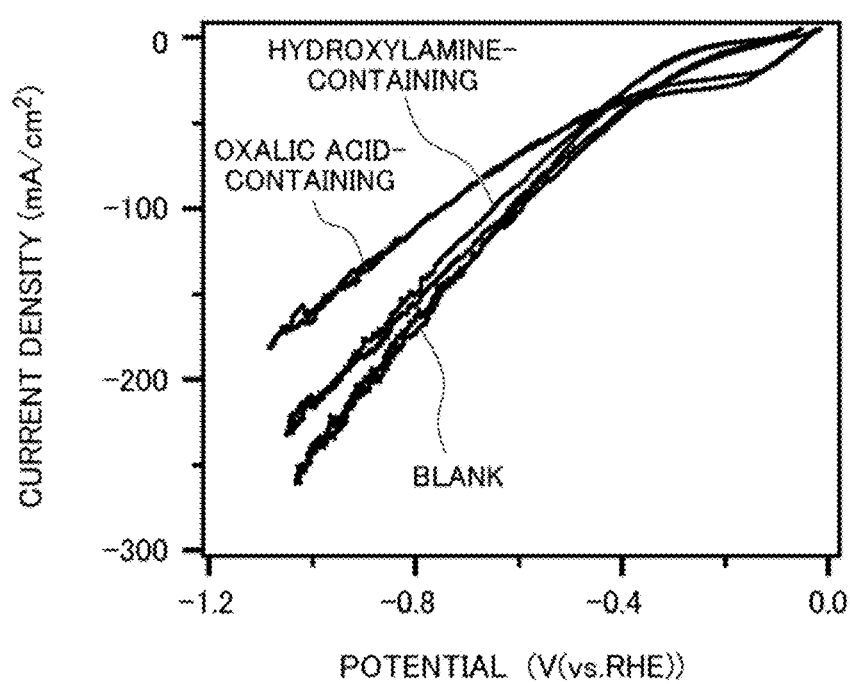
FIG. 6 is a graph for describing a CV measurement result in Example 3.

The electrode catalyst in Example 3 was installed as the working electrode of the electrochemical cell shown in FIG. 3 and CV measurement was performed in the same manner as in Example 1. The results are shown in FIG. 6. Table 1 shows the measurement results of a current density (mA/cm$^2$) at a potential of –0.5 V (vs. RHE).

Example 4: Molybdenum Plate Having Molybdenum Oxide Supported Thereon

An electrode catalyst in Example 4 was produced in the same manner as in Example 2 except that a metal plate made of Mo having a thickness of 0.1 mm (manufactured by Niraco Co., Ltd.) was used instead of the metal plate made of Al.

Figure 7:
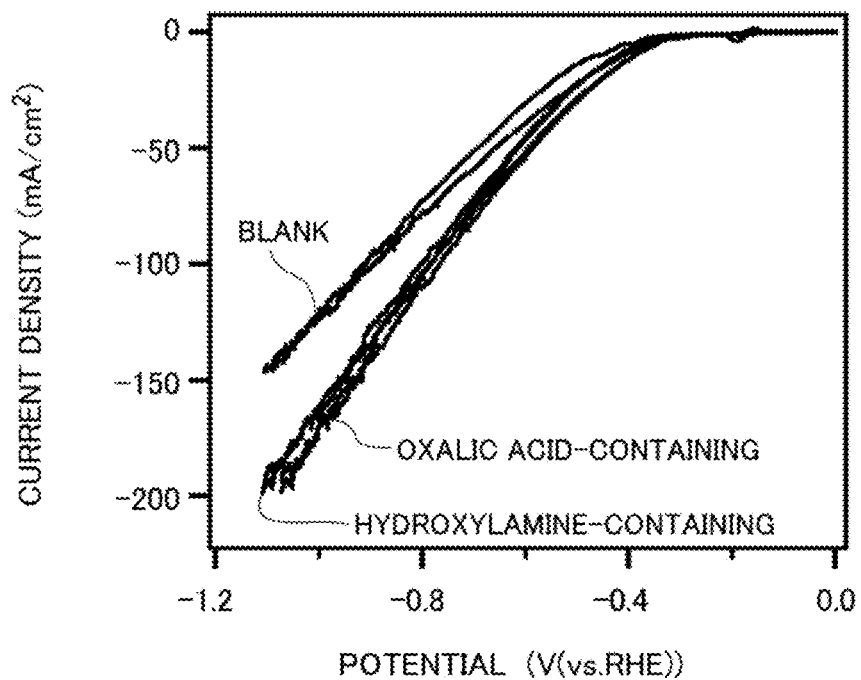
FIG. 7 is a graph for describing a CV measurement result in Example 4.

The electrode catalyst in Example 4 was installed as the working electrode of the electrochemical cell shown in FIG. 3 and CV measurement was performed in the same manner as in Example 1. The results are shown in FIG. 7. Furthermore, Table 1 shows the measurement results of a current density (mA/cm$^2$) at a potential of –0.5 V (vs. RHE).

Example 5: Niobium Plate Having Niobium Oxide Supported Thereon

An electrode catalyst in Example 5 was produced in the same manner as in Example 2 except that a metal plate made of Nb having a thickness of 0.1 mm (manufactured by Niraco Co., Ltd.) was used instead of the metal plate made of Al.

Figure 8:
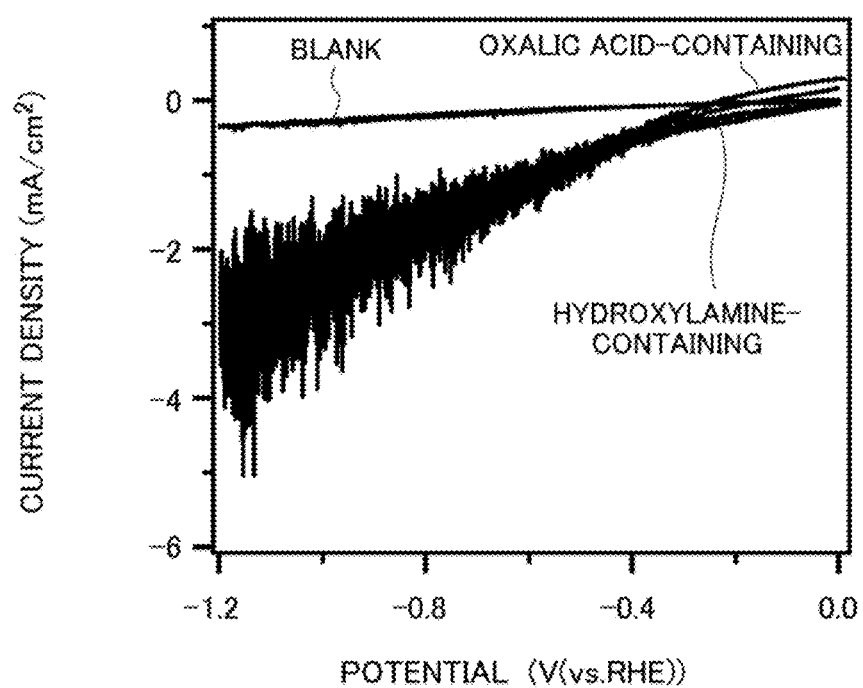
FIG. 8 is a graph for describing a CV measurement result in Example 5.

The electrode catalyst in Example 5 was installed as the working electrode of the electrochemical cell shown in FIG. 3 and CV measurement was performed in the same manner as in Example 1. The results are shown in FIG. 8. Furthermore, Table 1 shows the measurement results of a current density (mA/cm$^2$) at a potential of −0.5 V (vs. RHE).

Example 6: Nickel Plate Having Nickel Oxide Supported Thereon

An electrode catalyst in Example 6 was produced in the same manner as in Example 2 except that a metal plate made of Ni having a thickness of 0.1 mm (manufactured by Niraco Co., Ltd.) was used instead of the metal plate made of Al.

Figure 9:
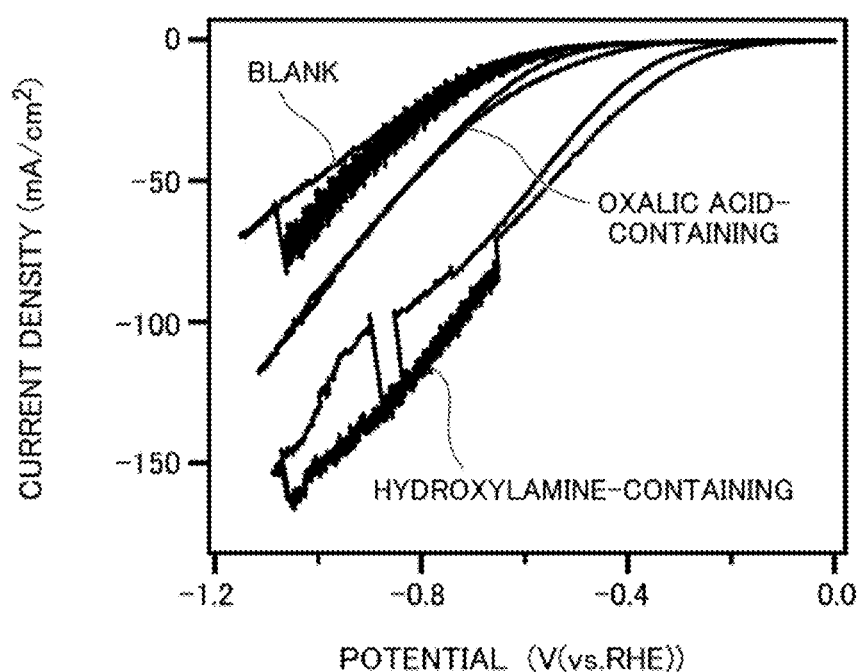
FIG. 9 is a graph for describing a CV measurement result in Example 6.

The electrode catalyst in Example 6 was installed as the working electrode of the electrochemical cell shown in FIG. 3 and CV measurement was performed in the same manner as in Example 1. The results are shown in FIG. 9. Furthermore, Table 1 shows the measurement results of a current density (mA/cm$^2$) at a potential of −0.5 V (vs. RHE).

Example 7: Vanadium Plate Having Vanadium Oxide Supported Thereon

An electrode catalyst in Example 7 was produced in the same manner as in Example 2 except that a metal plate made of V having a thickness of 0.1 mm (manufactured by Niraco Co., Ltd.) was used instead of the metal plate made of Al.

Figure 10:
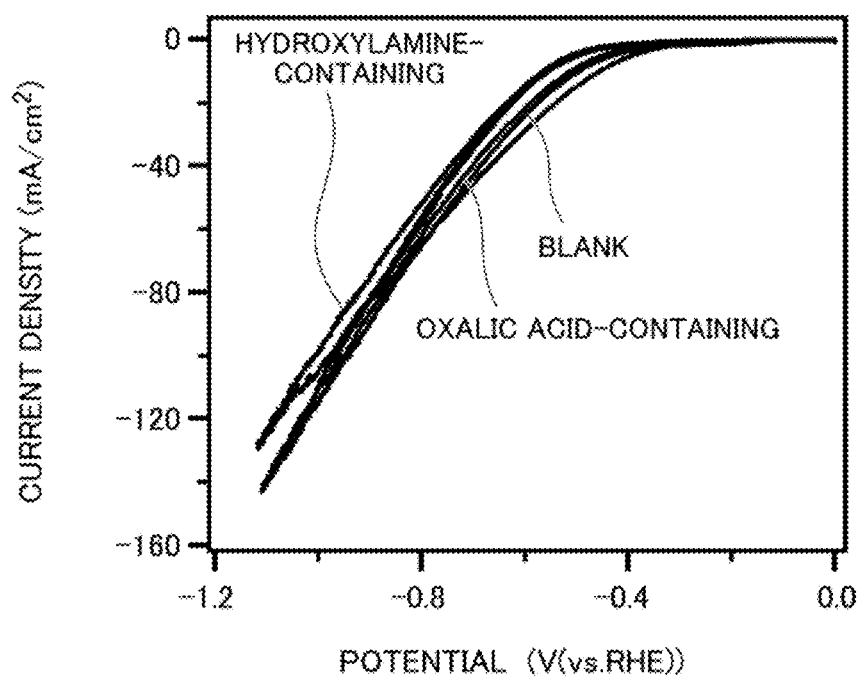
FIG. 10 is a graph for describing a CV measurement result in Example 7.

The electrode catalyst in Example 7 was installed as the working electrode of the electrochemical cell shown in FIG. 3 and CV measurement was performed in the same manner as in Example 1. The results are shown in FIG. 10. Furthermore, Table 1 shows the measurement results of a current density (mA/cm$^2$) at a potential of −0.5 V (vs. RHE).

Example 8: Tungsten Plate Having Tungsten Oxide Supported Thereon

An electrode catalyst in Example 8 was produced in the same manner as in Example 2 except that a metal plate made of W having a thickness of 0.1 mm (manufactured by Niraco Co., Ltd.) was used instead of the metal plate made of Al.

Figure 11:
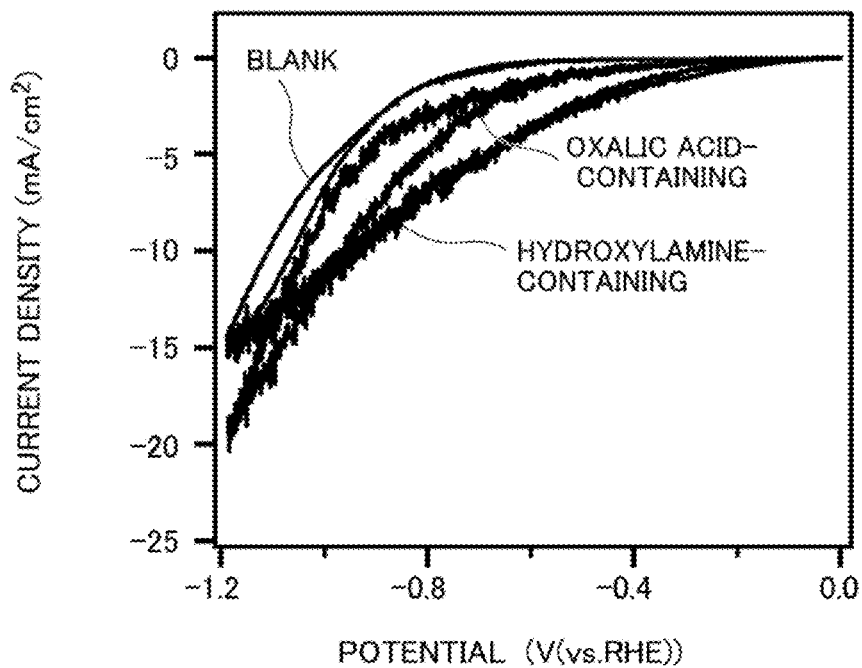
FIG. 11 is a graph for describing a CV measurement result in Example 8

The electrode catalyst in Example 8 was installed as the working electrode of the electrochemical cell shown in FIG. 3 and CV measurement was performed in the same manner as in Example 1. The results are shown in FIG. 11. Furthermore, Table 1 shows the measurement results of a current density (mA/cm$^2$) at a potential of −0.5 V (vs. RHE).

Example 9: Zirconium Plate Having Zirconium Oxide Supported Thereon

An electrode catalyst in Example 9 was produced in the same manner as in Example 2 except that a metal plate made of Zr having a thickness of 0.1 mm (manufactured by Niraco Co., Ltd.) was used instead of the metal plate made of Al.

Figure 12:
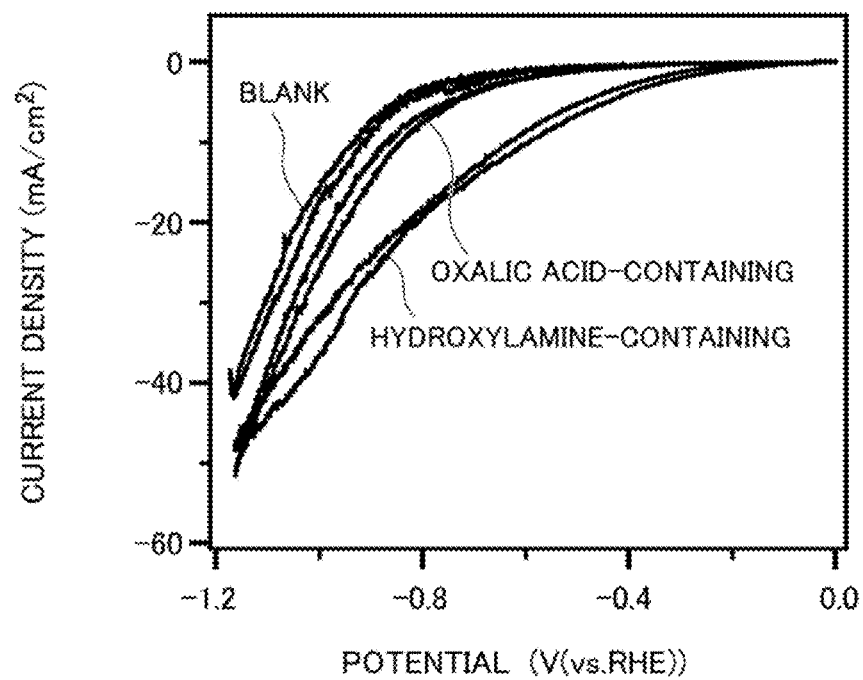
FIG. 12 is a graph for describing a CV measurement result in Example 9.

The electrode catalyst in Example 9 was installed as the working electrode of the electrochemical cell shown in FIG. 3 and CV measurement was performed in the same manner as in Example 1. The results are shown in FIG. 12. Furthermore, Table 1 shows the measurement results of a current density (mA/cm$^2$) at a potential of −0.5 V (vs. RHE).

Example 10: Titanium Plate Having Titanium Oxide Supported Thereon

An electrode catalyst in Example 10 was produced in the same manner as in Example 2 except that a metal plate made of Ti having a thickness of 0.1 mm (manufactured by Niraco Co., Ltd.) was used instead of the metal plate made of Al.

Figure 13:
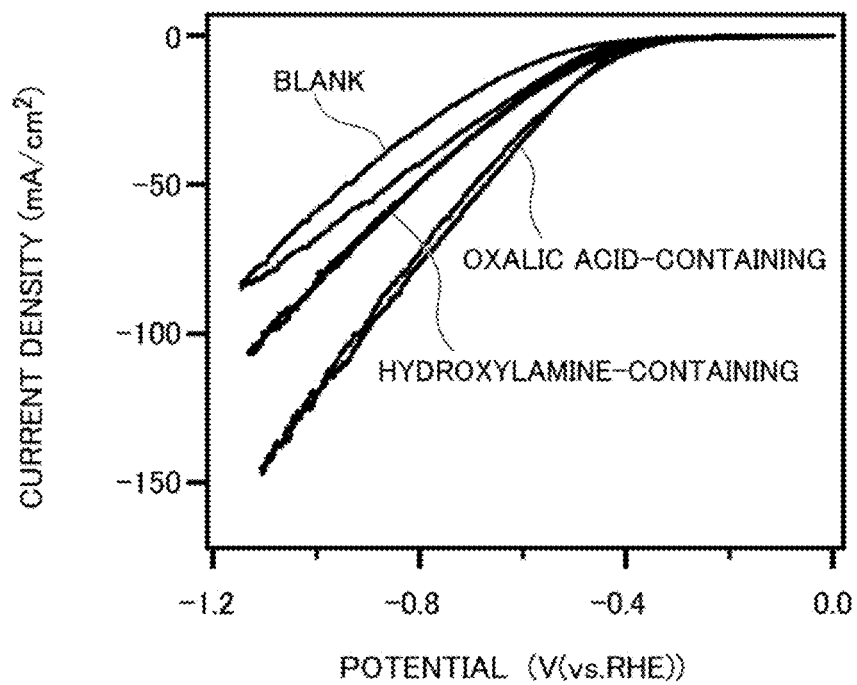
FIG. 13 is a graph for describing a CV measurement result in Example 10.

The electrode catalyst in Example 10 was installed as the working electrode of the electrochemical cell shown in FIG. 3 and CV measurement was performed in the same manner as in Example 1. The results are shown in FIG. 13. Furthermore, Table 1 shows the measurement results of a current density (mA/cm$^2$) at a potential of −0.5 V (vs. RHE).

Example 11: Titanium Plate on which Titanium Oxide Having Rutile Type Titanium Oxide Supported Thereon is Supported A coating step of applying a solution containing titanium oxide and a calcining step were performed using the electrode catalyst in Example 10 as an electrode support as will be described later.

10 mg of Titanium oxide (TIO-6; Japan reference catalyst) having a rutile type crystal structure and 400 μL of ethanol were introduced into a sample tube and irradiated with ultrasonic waves for 10 minutes to prepare a suspension solution containing titanium oxide. The obtained suspension solution containing titanium oxide was uniformly applied to both of the front and back surfaces within a range of a length of 20 mm and a width of 20 mm along an edge portion of the electrode catalyst in Example 10 using a micropipette and dried (coating step).

The electrode catalyst in Example which has been subjected to drying was put into a tubular furnace having a diameter 2.5 cm and heated at 200° C. for 30 minutes while flowing air in the tubular furnace at a flow rate of 1 atm and 60 ccm (cm$^3$ min$^{-1}$) (calcining step). The electrode catalyst which has been subjected to calcining was cooled to room temperature and the metal plate was taken out from the tubular furnace. Through the above steps, the electrode catalyst in Example 11 was obtained.

Figure 14:
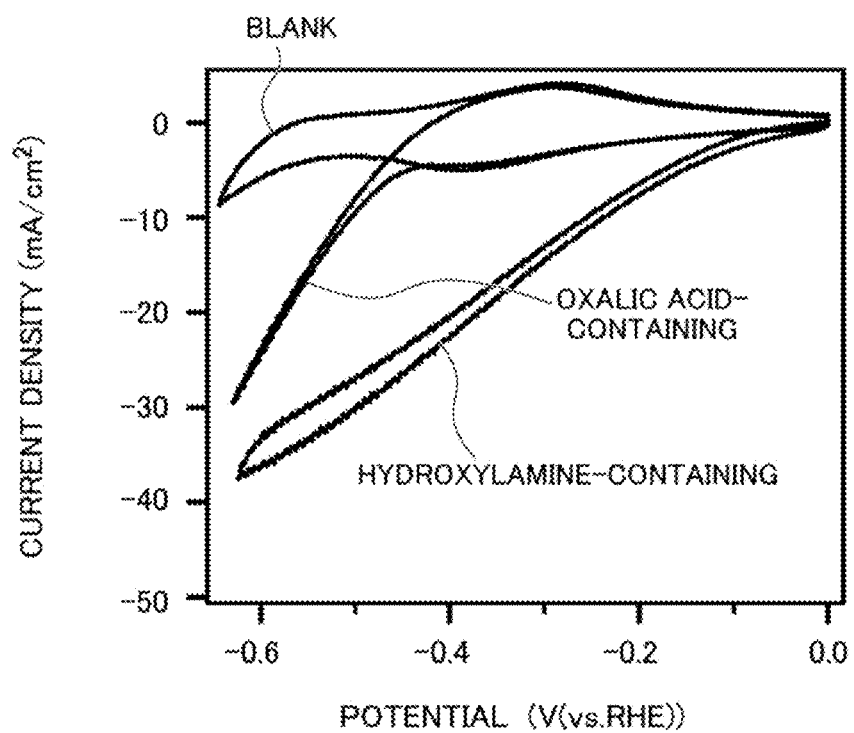
FIG. 14 is a graph for describing a CV measurement result in Example 11.

The electrode catalyst in Example 11 was installed as the working electrode of the electrochemical cell shown in FIG. 3 and CV measurement was performed in the same manner as in Example 1. The results are shown in FIG. 14. Furthermore, Table 1 shows the measurement results of a current density (mA/cm$^2$) at a potential of −0.5 V (vs. RHE).

Example 12: Titanium Plate on which Titanium Oxide Having Anatase Type Titanium Oxide Supported Thereon is Supported Except that titanium oxide having an anatase type crystal structure (TIO-7; Japan reference catalyst) was used instead of the titanium oxide having a rutile type crystal structure (TIO-6, Japan reference catalyst) used in Example 11, the electrode catalyst in Example 12 was produced in the same manner as in Example 11. As a result of observing TIO-7 using a scanning electron microscope image (SEM), the titanium oxide was titanium oxide having ridges and vertices.

Figure 15:
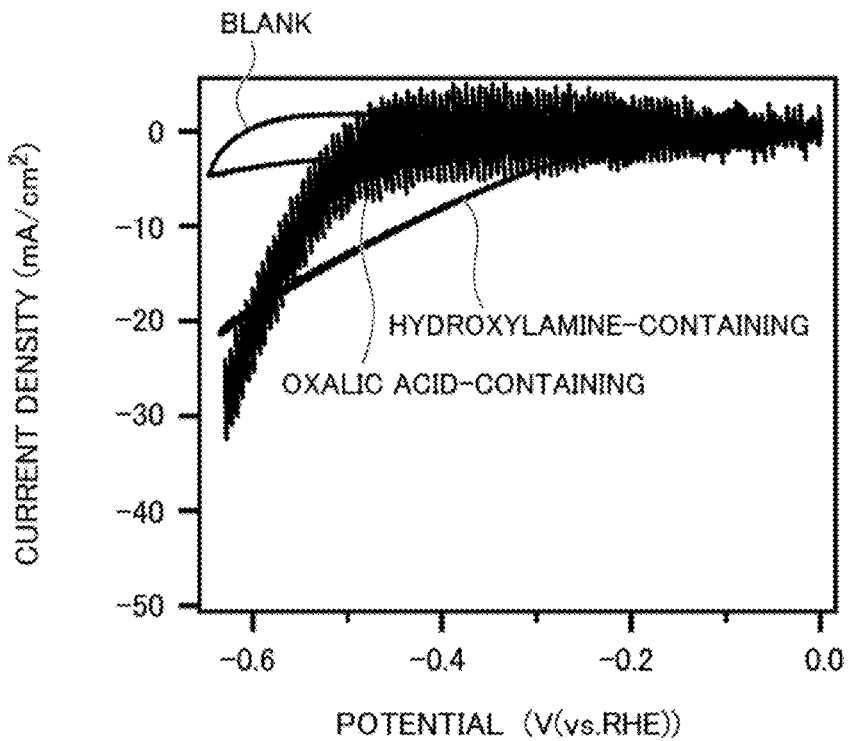
FIG. 15 is a graph for describing a CV measurement result in Example 12.

The electrode catalyst in Example 12 was installed as the working electrode of the electrochemical cell shown in FIG. 3 and CV measurement was performed in the same manner as in Example 1. The results are shown in FIG. 15. Furthermore, Table 1 shows the measurement results of a current density (mA/cm$^2$) at a potential of −0.5V (vs. RHE).

TABLE 1

| | | | Electrolyte solution (mA/cm$^{-2}$) | | |
|---|---|---|---|---|---|
| | Electrode catalyst | | | Oxalic acid-containing | Hydroxylamine sulfate-containing |
| Example | Electrode support | Support layer | Blank | solution | solution |
| 1 | Titanium mesh | Titanium oxide | −25 | −40 | −55 |
| 2 | Aluminum plate | Aluminum oxide | −38 | −50 | −65 |
| 3 | Cobalt plate | Cobalt oxide | −100 | −90 | −70 |
| 4 | Molybdenum plate | Molybdenum oxide | −45 | −55 | −55 |
| 5 | Niobium plate | Niobium oxide | −0.10 | −1.2 | −1.2 |
| 6 | Nickel plate | Nickel oxide | −10 | −20 | −65 |
| 7 | Vanadium plate | Vanadium oxide | −22 | −20 | −30 |
| 8 | Tungsten plate | Tungsten oxide | −0.50 | −1.5 | −4.0 |
| 9 | Zirconium plate | Zirconium oxide | −0.5 | −2.0 | −10 |
| 10 | Titanium plate | Titanium oxide | −20 | −38 | −21 |
| 11 | Titanium plate | Calcined rutile type titanium oxide/calcined titanium oxide | −8.0 | −26 | −37 |
| 12 | Titanium plate | Calcined anatase type titanium oxide/calcined titanium oxide | −5.0 | −20 | −20 |

From FIGS. 4 to 15, also in any of the electrodes in Examples 1 to 12, it was found that, as the potential was further swept to the negative side, currents, which were derived from hydrogen generation when the electrolyte solution was blank, oxalic acid reduction, and hydroxylamine reduction, increased.

Also, as shown in FIG. 13, the electrode catalyst in Example 10 made of a calcined titanium plate was different from the electrode catalysts in Examples 1 to 9 and Examples 11 and 12, and in Example 10, the current derived from oxalic acid reduction was observed to be larger than the current derived from hydroxylamine reduction. From this, it was found that the electrode catalyst in Example 10 had a higher catalytic ability for oxalic acid reduction than that for hydroxylamine reduction. Furthermore, it was found that the electrode catalyst in Example 10 was suitable as an electrode catalyst in the case of producing an amino acid (glycine) by reducing oxalic acid to an α-keto acid and subjecting the α-keto acid to a reductive amination reaction together with hydroxylamine.

Example 13

The electrode catalyst in Example 1 was installed as the working electrode 31 of the electrochemical cell shown in FIG. 16 and a solution of 35 ml of ammonium/ammonia buffer solution (6M) in which a pH of 493 mg (5.60 mmol) of pyruvic acid which is an α-keto acid was adjusted to pH 10 was introduced into a cell 37 on the working electrode side. Furthermore, 35 ml of ammonium/ammonia buffer solution (6M) adjusted to pH 10 was introduced into the chamber 34 on the counter electrode 32 side.

Subsequently, the electrochemical cell was heated and stirred and constant potential electrolysis (chronoamperometry (CA)) was performed at a potential of −0.32 V (vs. reversible hydrogen electrode (RHE)) at 40° C. for 2 hours.

After that, $^1$H NMR measurement was performed on the solution in the chamber 37 on the working electrode 31 side which has been subject constant potential electrolysis (CA) using an NMR device (Avance III; manufactured by Bruker) to confirm the production of alanine.

After that, the α-keto acid conversion rate, the amino acid yield, and the Faraday efficiency of amino acid production in the reaction in Example 13 were calculated. The results are shown in Table 2.

Example 14

77.7 mg (1.05 mmol) of glyoxylic acid was used as an α-keto acid instead of pyruvic acid and the constant potential electrolysis was performed in the same manner as in Example 13 except that the temperature of the constant potential electrolysis (CA) was set to 50° C.

The solution in the chamber 37 on the working electrode 31 side which has been subject constant potential electrolysis (CA) was subjected to $^1$H NMR measurement in the same manner as in Example 13 to confirm that glycine was produced.

After that, the α-keto acid conversion rate, the amino acid yield, and the Faraday efficiency of amino acid production in the reaction in Example 14 were calculated. The results are shown in Table 2.

Example 15

153 mg (1.05 mmol) of α-keto gultaric acid was used as an α-keto acid instead of pyruvic acid and the constant potential electrolysis (CA) was performed in the same as in Example 13 except that the temperature of the constant potential electrolysis was set to 50° C.

The solution in the chamber 37 on the working electrode 31 side which has been subjected to the constant potential electrolysis (CA) was subjected to $^1$H NMR measurement in the same manner as in Example 13 to confirm that glutamic acid was produced.

After that, the α-keto acid conversion rate, the amino acid yield, and the Faraday efficiency of amino acid production in the reaction in Example 15 were calculated. The results are shown in Table 2.

Example 16

Constant potential electrolysis (CA) was performed in the same as in Example 13 except that, as an α-keto acid, 137 mg (1.05 mmol) of 4-methyl-2-oxooxy acid was used instead of pyruvic acid and the temperature of constant potential electrolysis was set to 50° C.

The solution in the chamber 37 on the working electrode 31 side which has been subjected to the constant potential electrolysis (CA) was subjected to $^1$H NMR measurement in the same manner as in Example 13 to confirm that leucine was produced.

After that, the α-keto acid conversion rate, the amino acid yield, and the Faraday efficiency of amino acid production in the reaction in Example 16 were calculated. The results are shown in Table 2.

Table 2 shows the α-keto acid concentration in the solution in the chamber 37 on the working electrode 31 side which has been subjected to the constant potential electrolysis (CA) and the concentration of the ammonium/ammonia buffer solution for each of Examples 13 to 16. The temperature of constant potential electrolysis is also shown.

TABLE 2

| Example | Amino acid | Reaction condition | | | Results | | |
|---|---|---|---|---|---|---|---|
| | | α-keto acid concentration (mmol/l) | Buffer solution concentration (mol/l) | Temperature (° C.) | α-keto acid conversion rate (%) | Amino acid yield (%) | Faraday efficiency of amino acid production (%) |
| 13 | Alanine | 160 | 6 | 40 | 94.4 | 11.1 | 28.7 |
| 14 | Glycine | 30 | 1.5 | 50 | —* | 2.86 | 10.2 |
| 15 | Glutamic acid | 30 | 1.5 | 50 | —* | 6.38 | 16.4 |
| 16 | Leucine | 30 | 1.5 | 50 | —* | 6.72 | 16.8 |

*Non-quantity

Consideration

As shown in Table 2, it was found that the electrochemical cell shown in FIG. 16 was used, the electrode catalyst in Example 1 was installed as the working electrode 31, the solution containing an α-keto acid and ammonia was introduced into the chamber 37 on the working electrode 31 side, and constant potential electrolysis (CA) was performed so that amino acid could be produced.

From this result, it was confirmed that the electrode catalyst in Example 1 had an ability as a catalyst for promoting the reductive amination reaction of α-keto acids.

Example 17

An amino acid (alanine) was produced through the method which will be described later using the electrochemical cell shown in FIG. 16.

The electrode catalyst in Example 1 was installed on the working electrode 31 of the electrochemical cell shown in FIG. 16 and a solution of pH 0.19 in which 493 mg (5.60 mmol) of pyruvic acid which was an α-keto acid and 551 mg (3.36 mmol) of hydroxylamine sulfate which was a nitrogen compound were dissolved in 35 ml of a 0.5 mol/L sulfuric acid aqueous solution was input into the chamber 37 on the working electrode 31 side. Furthermore, 35 ml of a 0.5 mol/L sulfuric acid aqueous solution having a pH of 0.28 was introduced into the chamber 34 on the counter electrode 32 side. In addition, the solution in the chamber 37 on the working electrode 31 side and the sulfuric acid aqueous solution in the chamber 34 on the counter electrode 32 side were degassed using argon bubbling for about 30 minutes under ice cooling (0° C.).

Subsequently, constant potential electrolysis (chronoamperometry (CA)) was performed at 0° C. for 2 hours at a potential of −0.50 V (vs. reversible hydrogen electrode (RHE)) while stirring the solution in the chamber 37 and the sulfuric acid aqueous solution in the chamber 34 using the stirrers 35 and 35.

After that, $^1$H NMR measurement was performed on the solution in the chamber 37 on the working electrode 31 side which has subjected to the constant potential electrolysis (CA) and it was confirmed that alanine was produced.

After that, the α-keto acid conversion rate, the amino acid yield, and the Faraday efficiency of amino acid production in the reaction in Example 17 were calculated. The results are shown in Table 3.

Example 18

Constant potential electrolysis (CA) was performed in the same manner as in Example 17 except that 414 mg (5.60 mmol) of glyoxylic acid was used as an α-keto acid instead of pyruvic acid. A pH of the solution introduced into the chamber 37 on the working electrode 31 side was 0.12.

The solution in the chamber 37 on the working electrode 31 side which has been subjected to the constant potential electrolysis (CA) was subjected to $^1$H NMR measurement in the same manner as in Example 17 to confirm that glycine was produced.

After that, the α-keto acid conversion rate, the amino acid yield, and the Faraday efficiency of amino acid production in the reaction in Example 18 were calculated. The results are shown in Table 3.

Example 19

Constant potential electrolysis (CA) was performed in the same manner as in Example 17 except that 818 mg (5.60 mmol) of α-ketoglutaric acid was used instead of pyruvic acid as an α-keto acid. A pH of the solution introduced into the chamber 37 on the working electrode 31 side was 0.11.

The solution in the chamber 37 on the working electrode 31 side which has been subjected to the constant potential electrolysis (CA) was subjected to $^1$H NMR measurement in the same manner as in Example 17 to confirm that glutamic acid was produced.

After that, the α-keto acid conversion rate, the amino acid yield, and the Faraday efficiency of amino acid production in the reaction in Example 19 were calculated. The results as shown in Table 3.

Example 20

Constant potential electrolysis (CA) was performed in the same manner as in Example 17 except that 364 mg (2.80 mmol) of 4-methyl-2-oxovaeric acid was used as an α-keto acid instead of pyruvic acid and that the amount of hydroxylamine sulfate to be used was 276 mg (1.68 mmol). A pH of the solution introduced into the chamber 37 on the working electrode 31 side was 0.12.

The solution in the chamber 37 on the working electrode 31 side which has been subjected to the constant potential electrolysis (CA) was subjected to $^1$H NMR measurement in the same manner as in Example 17 to confirm that leucine was produced.

After that, the α-keto acid conversion rate, the amino acid yield, and the Faraday efficiency of amino acid production in the reaction in Example 20 were calculated. The results are shown in Table 3.

Example 21

Constant potential electrolysis (CA) was performed in the same manner as in Example 17 except that 115 mg (700 μmol) of phenylpyruvic acid was used as an α-keto acid instead of pyruvic acid and an amount of hydroxylamine sulfate to be used was 68.9 mg (420 μmol) and dimethyl sulfoxide was contained in the solutions in the chamber 37 on the working electrode 31 and the chamber 34 on the counter electrode 32 side in a proportion of 33% by volume to improve the solubility of an α-keto acid. A pH of the solution introduced into the chamber 37 on the working electrode 31 side was 0.18.

The solution in the chamber 37 on the working electrode 31 side which has been subjected to the constant potential electrolysis (CA) was subjected to $^1$H NMR measurement in the same manner as in Example 17 to confirm that phenylalanine was produced.

After that, the α-keto acid conversion rate, the amino acid yield, and the Faraday efficiency of amino acid production in the reaction in Example 21 were calculated. The results are shown in Table 3.

Example 22

Constant potential electrolysis (CA) was performed in the same manner as in Example 17 except that 189 mg (1.05 mmol) of 4-hydroxylphenylpyruvic acid was used as an α-keto acid instead of pyruvic acid, an amount of hydroxylamine sulfate to be used was 103 mg (630 μmol), and dimethyl sulfoxide was contained in the solution in the chamber 37 on the working electrode 31 side and the chamber 34 on the counter electrode 32 side in a proportion of 25% by volume to improve the solubility of an α-keto acid. A pH of the solution introduced into the chamber 37 on the working electrode 31 side was 0.18.

The solution in the chamber 37 on the working electrode 31 side which has been subjected to the constant potential electrolysis (CA) was subjected to $^1$H NMR measurement in the same manner as in Example 17, and it was confirmed that tyrosine was produced.

After that, the α-keto acid conversion rate, the amino acid yield, and the Faraday efficiency of amino acid production in the reaction in Example 22 were calculated. The results are shown Table 3.

Table 3 shows an α-keto acid concentration and a $(NH_2OH)_2 \cdot 2H_2SO_4$ concentration in the solution in the chamber 37 on the working electrode 31 side which has not been subjected to the constant potential electrolysis (CA), together, for each of Examples 17 to 22.

TABLE 3

| Example | Amino acid | Reaction condition | | Result | | |
|---|---|---|---|---|---|---|
| | | α-keto acid concentration (mmol/l) | $(NH_2OH)_2 \cdot 2H_2SO_4$ concentration (mmol/l) | α-keto acid conversion rate (%) | amino acid yield (%) | Faraday efficiency of amino acid production (%) |
| 17 | Alanine | 160 | 96 | 18.1 | 13.4 | 99.5 |
| 18 | Glycine | 160 | 96 | 16.1 | 13.9 | 96.4 |
| 19 | Glutamic acid | 160 | 96 | 13.3 | 12.2 | 95.4 |
| 20 | Leucine | 80 | 48 | 10.8 | 10.4 | 90.6 |
| 21 | Phenylalanine | 20 | 12 | 40.3 | 35.9 | 87.0 |
| 22 | Tyrosine | 30 | 18 | 25.0 | 21.3 | 75.3 |

Consideration

As shown in Table 3, it was found that the electrochemical cell shown in FIG. 16 was used, the electrode catalyst in Example 1 was installed as the working electrode 31, the solution containing an α-keto acid and hydroxylamine was input into the chamber 37 on the working electrode 31 side, and constant potential electrolysis (CA) was performed so that amino acid can be produced with high Faraday efficiency which exceeds 90%.

Also, from the results shown in Tables 2 and 3, when the electrochemical cell shown in FIG. 16 was used, the electrode catalyst in Example 1 was installed as the working electrode 31, the solution containing an α-keto acid and nitrogen compound was input into the chamber 37 on the working electrode 31 side, and constant potential electrolysis (CA) was performed, it was found that the Faraday efficiency of amino acid production in a case in which hydroxylamine is used as a nitrogen compound is higher than that of a case in which ammonia is used as a nitrogen compound.

This is because, when ammonia is used as a nitrogen compound, α-hydroxyl acid is produced as a by-product in the reductive amination reaction of α-keto acids. To be more specific, when ammonia is used as a nitrogen compound, as shown in the following Formula (8), the production of imine which is an intermediate product is insufficient. Thus, it is considered that an α-keto acid was directly reduced due to two electrons and two protons and as a result, α-hydroxyl acid was produced.

Chemical Formula 10

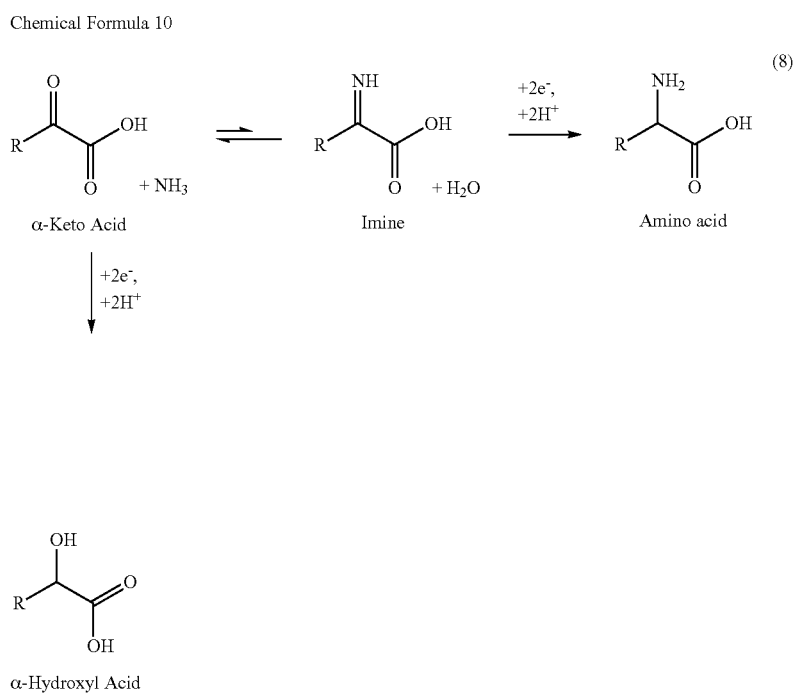

On the other hand, when hydroxylamine is used as the nitrogen compound, in the reductive amination reaction of α-keto acids, the reaction proceeds via an intermediate oxime as shown in the following Formula (9). Since the reaction between hydroxylamine and an α-keto acid provides oxime quantitatively, it can be expected that amino acid is selectively produced.

Chemical Formula 11

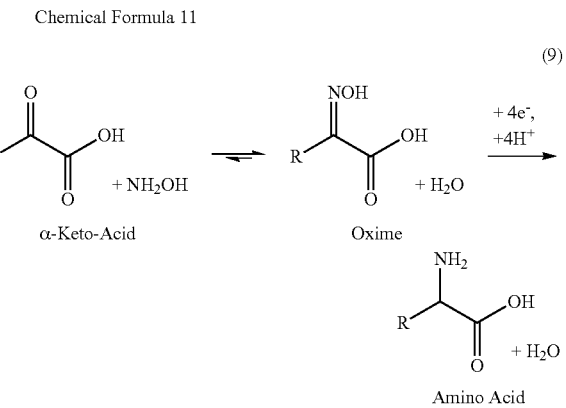

Example 23: Production of Glycine

As the working electrode 31 in the electrochemical cell shown in FIG. 16, an amino acid (glycine) was produced through the method which will be described later using a working electrode having the electrode catalyst in Example 10 to be installed.

A solution of pH 0.12 in which 504 mg (5.60 mmol) of oxalic acid which was carbonyl compound and 460 mg (2.80 mmol) of hydroxylamine sulfate which was a nitrogen compound are dissolved in 35 ml of a 0.2 mol/L sulfuric acid aqueous solution was input into the chamber 37 on the working electrode 31 side of the electrochemical cell shown in FIG. 16. Furthermore, 35 ml of a 0.2 mol/L sulfuric acid aqueous solution having a pH of 0.51 was introduced into the chamber 34 on the counter electrode 32 side.

Also, the solution in the chamber 37 on the working electrode 31 side and the sulfuric acid aqueous solution in the chamber 34 on the counter electrode 32 side were degassed using argon bubbling for about 30 minutes at room temperature (20° C.).

Subsequently, constant potential electrolysis (chronoamperometry (CA)) was performed at room temperature for 2 hours at a potential of −0.70 V (vs. reversible hydrogen electrode (RHE)) while stirring the solution in the chamber 37 and the sulfuric acid aqueous solution in the chamber 34 using the stirrers 35 and 35.

After that, the solution in the chamber 37 on the working electrode 31 side which has been subjected to the constant potential electrolysis (CA) was subjected to $^1$H-NMR measurement and it was confirmed that glycine was produced. For the results of $^1$H-NMR measurement, it was confirmed that, in Example 23, oxime glyoxylate and glycolic acid were also produced in addition to glycine.

After that, the α-keto acid conversion rate and the amino acid (glycine) yield were calculated in the same manner as in Example 13. Furthermore, the yields of oxime glyoxylate and glycolic acid were calculated in the same manner as the yield of glycine. In addition, the Faraday efficiency of production was calculated for each of the amino acid (glycine), oxime glyoxylate, and glycolic acid using the method which will be described later. The results are shown in Table 4.

TABLE 4

| Raw material | Conversion rate (%) | |
|---|---|---|
| Oxalic acid | 7.44 | |
| Product | Yield (%) | Faraday efficiency (%) |
| Oxime glyoxylate | 2.77 | 27.9 |
| Glycine | 0.92 | 27.8 |
| Glycolic acid | 0.44 | 9.02 |

Faraday Efficiency of Amino Acid Production

The Faraday efficiency of amino acid production is calculated through the following Formula (G) using the amino acid concentration in the solution in the chamber 37 on the working electrode 31 side which has been subjected to the constant potential electrolysis (CA):

$$\text{Faraday efficiency (\%)} = \{(6 \times N_{amino} \times F)/Q\} \times 100 \qquad (G).$$

(In Formula (G), $N_{amino}$ indicates an amount of substance (mol) of an amino acid which has been subjected to constant potential electrolysis, F indicates the Faraday's constant (96500 C/mol), and Q indicates an amount of electric charges (C) which has flowed between the working electrode and the counter electrode during constant potential electrolysis.)

Faraday Efficiency of Oxime Glyoxylate Production

The Faraday efficiency of oxime glyoxylate production was calculated through the following Formula (H) using the concentration of oxime glyoxylate in the solution in the chamber 37 on the working electrode 31 side which has been subjected to the constant potential electrolysis (CA):

$$\text{Faraday efficiency (\%)} = \{(2 \times N_{glyox} \times F)/Q\} \times 100 \qquad (H).$$

(In Formula (H), $N_{glyox}$ indicates an amount of substance (mol) of oxime glyoxylate which has been subjected to constant potential electrolysis, F indicates the Faraday's constant (96500 C/mol), and Q indicates an amount of electric charges (C) which has flowed between the working electrode and the counter electrode during constant potential electrolysis.)

Faraday Efficiency of Glycolic Acid Production

The Faraday efficiency of glycolic acid production was calculated through the following Formula (I) using the glycolic acid concentration in the solution in the chamber 37 on the working electrode 31 side which has been subjected to the constant potential electrolysis (CA):

$$\text{Faraday efficiency (\%)} = \{4 \times N_{glycol} \times F)/Q\} \times 100 \qquad (I).$$

(In Formula (I), $N_{glycol}$ indicates an amount of substance (mol) of glycolic acid which has been subjected to constant potential electrolysis, F indicates the Faraday's constant (96500 C/mol), and Q indicates an amount of electric charges (C) which has flowed between the working electrode and the counter electrode during constant potential electrolysis.)

Consideration

As shown in Table 4, in Example 23, the Faraday efficiency for producing glycine as an amino acid was 27.8% and the Faraday efficiency for producing oxime glyoxylate which was an intermediate product was 27.9%. On the other hand, the Faraday efficiency of glycolic acid production which is α-hydroxyl acid as a by-product was only 9.02%.

As described above, it was found that amino acids could be obtained through a reductive amination reaction in which a carbonyl compound and a nitrogen compound were used as raw materials using the electrode catalyst composed of an electrode support and titanium oxide supported on the electrode support. Furthermore, it was found that amino acids could be obtained with relatively excellent efficiency using an α-keto acid or a two-electron oxidized derivative of an α-keto acid as a carbonyl compound.

Example 24: Production of Valine

Constant potential electrolysis (CA) was performed in the same manner as in Example 17 except that 650 mg (5.60 mmol) of 3-methyl-2-oxobutyric acid was used as an α-keto acid instead of pyruvic acid.

The solution in the chamber 37 on the working electrode 31 side which has been subject to the constant potential electrolysis (CA) was subjected to $^1$H NMR measurement in the same manner as in Example 17 to confirm that valine was produced.

After that, the amino acid yield and the Faraday efficiency of amino acid production in the reaction in Example 24 were calculated. The results are shown in Table 5.

Example 25: Production of Isoleucine

Constant potential electrolysis (CA) was performed in the same manner as in Example 17 except that 547 mg (4.20 mmol) of 3-methyl-2-oxovaleric acid was used as an α-keto acid instead of pyruvic acid and an amount of hydroxylamine sulfate to be used was 413 mg (2.52 mmol).

The solution in the chamber 37 on the working electrode 31 side which has been subjected to the constant potential electrolysis (CA) was subjected to $^1$H NMR measurement in the same manner as in Example 17 to confirm that isoleucine was produced.

After that, the amino acid yield and the Faraday efficiency of amino acid production in the reaction in Example 25 were calculated. The results are shown in Table 5.

TABLE 5

| | Reaction condition | | Result | |
|---|---|---|---|---|
| Amino acid | α-keto acid concentration (mmol/L) | (NH$_2$OH)$_2$·2H$_2$SO$_4$ concentration (mmol/L) | Amino acid yield (%) | Faraday efficiency of amino acid production (%) |
| Valine | 160 | 96 | 6.87 | 84.3 |
| Isoleucine | 120 | 72 | 4.69 | 60.1 |

Production of Titanium Composite Oxide Particles (TinMmOx)

Production Example 1: Production of Ti—NbO$_2$ 0.67 mmol niobium (V) chloride (manufactured by Fuji Film Wako Pure Chemical Industries, Ltd.; product code 141-03941), 30 mL of acetone (manufactured by Fuji Film Wako Pure Chemical Industries, Ltd.; product code 013-00351) dehydrated with a molecular sieve 3A1/16 (manufactured by Fuji Film Wako Pure Chemical Industries, Ltd.; product code 134-06095), and 2.7 mmol titanium tetraisopropoxide (manufactured by Fuji Film Wako Pure Chemical Industries, Ltd.; product code 207-08176) were introduced into an autoclave (manufactured by AS ONE Corporation) made of Teflon (registered trademark) processed stainless steel having a capacity of 50 mL and stirred at room temperature for 30 minutes to obtain a mixture.

The obtained mixture was introduced into an electric oven and heated to 200° C. for 30 minutes and then heated at 200° C. for 24 hours. After that, the contents cooled to room temperature were transferred to two polypropylene centrifuge tubes (AGC technoglass, product code 2345-050) with a capacity of 50 mL and rotated at 6500 rpm for 5 minutes using a centrifuge (Eppendorf, Centrifuge 5804) to obtain a precipitate.

The obtained precipitate was washed with 20 mL to 30 mL of ethanol and centrifuged. Furthermore, the obtained precipitate was washed with a mixed solution of 12.5 mL ethanol and 12.5 mL acetone and centrifuged. The centrifuged precipitate was dried overnight at room temperature and then input into a desiccator and dried overnight.

After that, the precipitate was input into a tubular furnace and heated to 500° C. in 20 minutes under air flow (60 ccm) and then heated at 500° C. for 1 hour. After that, when a temperature of the furnace decreased to 420° C., an upper lid of the tubular furnace was opened and the tubular furnace was rapidly cooled using a fan to perform cooling to room temperature. Through the above steps, the titanium composite oxide particles of Production Example 1 were obtained.

Figure 17:
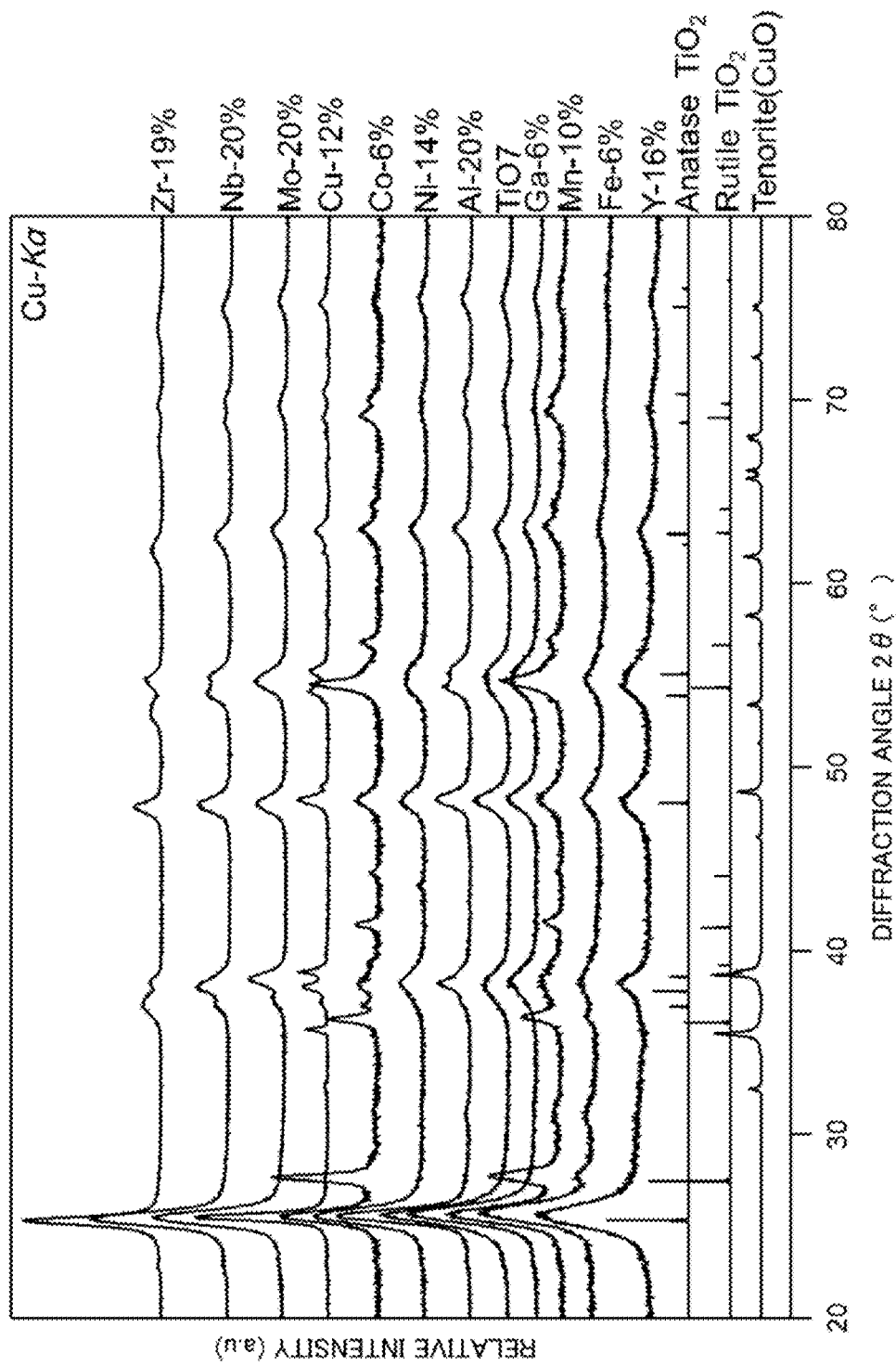
FIG. 17 is a chart showing X-ray diffraction results of titanium composite oxide particles in Production Examples 1 to 11.

The obtained titanium composite oxide particles of Production Example 1 were subjected to X-ray diffraction (XRD) measurement. The results are shown in FIG. 17.

Figure 18:
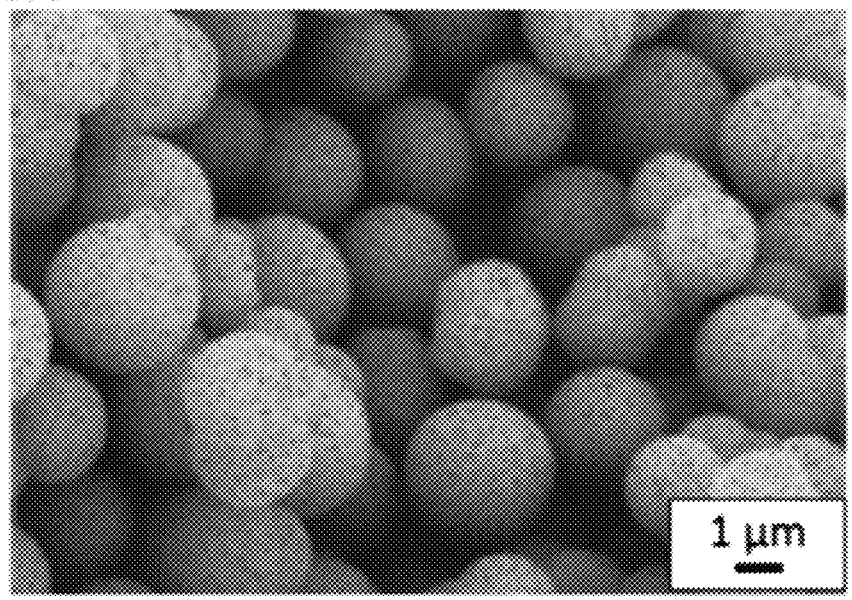
FIG. 18 is a photograph of titanium composite oxide particles in Production Example 1 captured using a field emission scanning electron microscope (EDS).

Also, with regard to the titanium composite oxide particles in Production Example 1, an atomic number ratio of the titanium composite oxide particles was obtained by performing field emission scanning electron microscope (EDS) analysis. From the results, it was confirmed that a composition of the titanium composite oxide particles of Production Example 1 was Ti—NbO$_2$ containing 20% by atom of Nb. FIG. 18 is a photograph of the titanium composite oxide particles of Production Example 1 captured using a field emission scanning electron microscope (EDS).

Production Example 2: Production of Ti—FeO$_2$

The same operation as in Production Example 1 was performed except that 0.67 mmol of iron (III) chloride hexahydrate (manufactured by Kanto Chemical Co., Inc.; product code 16018-30) was used instead of niobium (V) chloride in Production Example 1 to obtain titanium composite oxide particles in Production Example 2.

The obtained titanium composite oxide particles in Production Example 2 were subjected to X-ray diffraction (XRD) measurement. The results were shown in FIG. 17.

Also, an atomic number ratio of the titanium composite oxide particles was obtained by subjecting the titanium composite oxide particles in Production Example 2 to field emission scanning electron microscope (EDS) analysis. For the result, it was confirmed that a composition of the titanium composite oxide particles in Production Example 2 was Ti—FeO$_2$ containing 6% by atom of Fe.

Production Example 3: Production of Ti—GaO$_2$

The same operation as in Production Example 1 was performed except that 0.67 mmol of galium (III) chloride (manufactured by Fuji Film Wako Pure Chemical Industries, Ltd.; product code 078-02781) was used instead of niobium (V) chloride in Production Example 1 to obtain titanium composite oxide particles in Production Example 3.

The obtained titanium composite oxide particles in Production Example 3 were subjected to X-ray diffraction (XRD) measurement. The results are shown in FIG. 17.

Also, the titanium composite oxide particles in Production Example 3 were subjected to field emission scanning electron microscope (EDS) analysis to obtain an atomic number ratio of the titanium composite oxide particles. From the results, it was confirmed that the composition of the titanium composite oxide particles in Production Example 3 was Ti—GaO$_2$ containing 6% by atom of Ga.

Production Example 4: Production of Ti—AlO$_2$

The same operation as in Production Example 1 was performed except that 0.67 mmol of aluminum (III) chloride hexahydrate (manufactured by Kanto Chemical Co., Inc.; product code 01155-30) was used instead of niobium (V) chloride in Production Example 1 to obtain titanium composite oxide particles in Production Example 4.

The obtained titanium composite oxide particles in Production Example 4 were subjected to X-ray diffraction (XRD) measurement. The results are shown in FIG. 17.

Also, the titanium composite oxide particles in Production Example 4 were subjected to field emission scanning electron microscope (EDS) analysis to obtain an atomic number ratio of the titanium composite oxide particles. From the results, it was confirmed that the composition of the titanium composite oxide particles in Production Example 4 was Ti—AlO$_2$ containing 20% by atom of Al.

Production Example 5: Production of Ti—NiO$_2$

The same operation as in Production Example 1 was performed except that 0.67 mmol of nickel (II) chloride (manufactured by Fuji Film Wako Pure Chemical Industries, Ltd.; product code 141-01062) was used instead of niobium (V) chloride in Production Example 1 to obtain titanium composite oxide particles in Production Example 5.

The obtained titanium composite oxide particles in Production Example 5 were subjected to X-ray diffraction (XRD) measurement. The results are shown in FIG. 17.

Also, the titanium composite oxide particles in Production Example 5 were subjected to field emission scanning electron microscope (EDS) analysis to obtain an atomic number ratio of the titanium composite oxide particles. From the results, it was confirmed that the composition of the titanium composite oxide particles in Production Example 5 was Ti—$NiO_2$ containing 14% by atom of Ni.

Production Example 6: Production of Ti—$CoO_2$

The same operation as in Production Example 1 was performed except that 0.67 mmol of cobalt (II) chloride (manufactured by Kanto Chemical Co., Inc.; product code 07399-31) was used instead of niobium (V) chloride in Production Example 1 to obtain titanium composite oxide particles in Production Example 6.

The obtained titanium composite oxide particles in Production Example 6 were subjected to X-ray diffraction (XRD) measurement. The results are shown in FIG. 17.

Also, the titanium composite oxide particles in Production Example 6 were subjected to field emission scanning electron microscope (EDS) analysis to obtain an atomic number ratio of the titanium composite oxide particles. From the results, it was confirmed that the composition of the titanium composite oxide particles in Production Example 6 was Ti—$CoO_2$ containing 6% by atom of Co.

Production Example 7: Production of Ti—$YO_2$

The same operation as in Production Example 1 was performed except that 0.67 mmol of yttrium (III) chloride hexahydrate (manufactured by Fuji Film Wako Pure Chemical industries, Ltd.; product code 259-00272) was used instead of niobium (V) chloride in Production Example 1 to obtain titanium composite oxide particles in Production Example 7.

The obtained titanium composite oxide particles in Production Example 7 were subjected to X-ray diffraction (XRD) measurement. The results are shown in FIG. 17.

Figure 19:
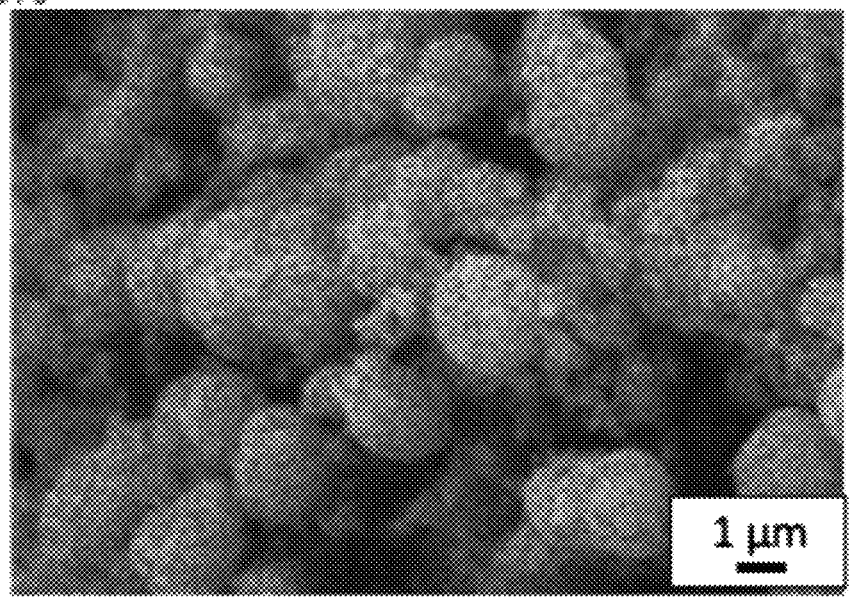
FIG. 19 is a photograph of titanium composite oxide particles in Production Example 7 captured using a field emission scanning electron microscope (EDS).

Also, the titanium composite oxide particles in Production Example 7 were subjected to field emission scanning electron microscope (EDS) analysis to obtain an atomic number ratio of the titanium composite oxide particles. From the results, it was confirmed that the composition of the titanium composite oxide particles in Production Example 7 was Ti—$YO_2$ containing 16% by atom of Y FIG. 19 is a photograph of the titanium composite oxide particles in Production Example 7 captured using a field emission scanning electron microscope (EDS).

Production Example 8: Production of Ti—$MnO_2$

The same operation as in Production Example 1 was performed except that 0.67 mmol of manganese chloride (manufactured by Fuji Film Wako Pure Chemical Industries, Ltd.; product code 139-00722) was used instead of niobium (V) chloride in Production Example 1 to obtain titanium composite oxide particles in Production Example 8.

The obtained titanium composite oxide particles in Production Example 8 were subjected to X-ray diffraction (XRD) measurement. The results are shown in FIG. 17.

Also, the titanium composite oxide particles in Production Example 8 were subjected to field emission scanning electron microscope (EDS) analysis to obtain an atomic number ratio of the titanium composite oxide particles. From the results, it was confirmed that the composition of the titanium composite oxide particles in Production Example 8 was Ti—$MnO_2$ containing 10% by atom of Mn.

Production Example 9: Production of Ti—$CuO_2$

The same operation as in Production Example 1 was performed except that 0.67 mmol of copper (I) chloride (manufactured by Kanto Chemical Co., Inc.; product code 07524-30) was used instead of niobium (V) chloride in Production Example 1 to obtain titanium composite oxide particles in Production Example 9.

The obtained titanium composite oxide particles in Production Example 9 were subjected to X-ray diffraction (XRD) measurement. The results are shown in FIG. 17.

Figure 20:
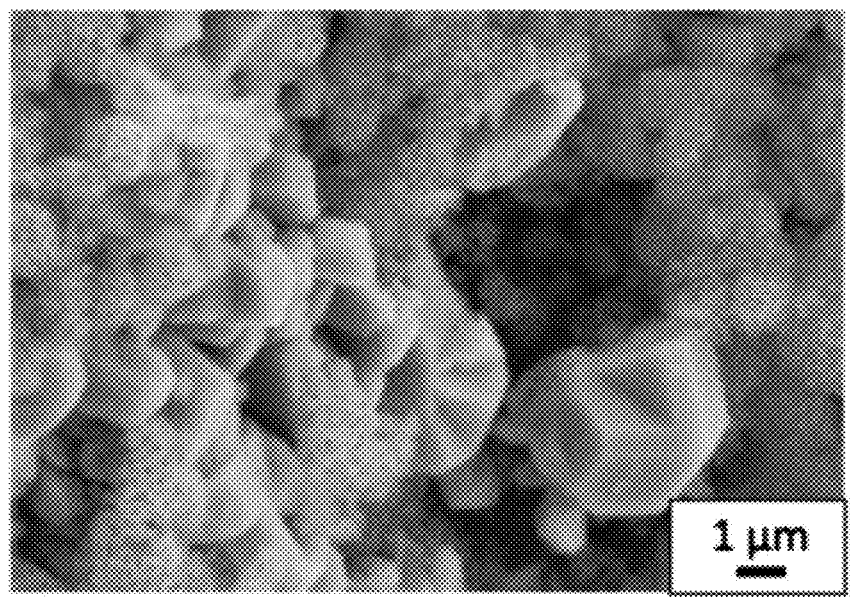
FIG. 20 is a photograph of titanium composite oxide particles in Production Example 9 captured using a field emission scanning electron microscope (EDS).

Also, the titanium composite oxide particles in Production Example 9 were subjected to field emission scanning electron microscope (EDS) analysis to obtain an atomic number ratio of the titanium composite oxide particles. From the results, it was confirmed that a composition of the titanium composite oxide particles in Production Example 9 was Ti—$CuO_2$ containing 12% by atom of Cu. FIG. 20 is a photograph of the titanium composite oxide particles in Production Example 9 captured using a field emission scanning electron microscope (EDS).

Production Example 10: Production of Ti—$ZrO_2$

The same operation as in Production Example 1 was performed except that 0.67 mmol of zirconium (IV) chloride (manufactured by Fuji Film Wako Pure Chemical Industries, Ltd.; product code 265-00672) was used instead of niobium (V) chloride in Production Example 1 to obtain titanium composite oxide particles in Production Example 10.

The obtained titanium composite oxide particles in Production Example 10 were subjected to X-ray diffraction (XRD) measurement. The results are shown in FIG. 17.

Also, the titanium composite oxide particles in Production Example 10 were subjected to field emission scanning electron microscope (EDS) analysis to obtain an atomic number ratio of the titanium composite oxide particles. From the results, it was confirmed that a composition of the titanium composite oxide particles in Production Example 10 was Ti—$ZrO_2$ containing 19% by atom of Zr.

Production Example 11: Production of Ti-Moth

The same operation as in Production Example 1 was performed except that 0.67 mmol of molybdenum (V) chloride (manufactured by Mitsuwa Chemicals Co., Ltd.; purity 2N) was used instead of niobium (V) chloride in Production Example 1 to obtain titanium composite oxide particles in Production Example 11.

The obtained titanium composite oxide particles in Production Example 11 were subjected to X-ray diffraction (XRD) measurement. The results are shown in FIG. 17.

Figure 21:
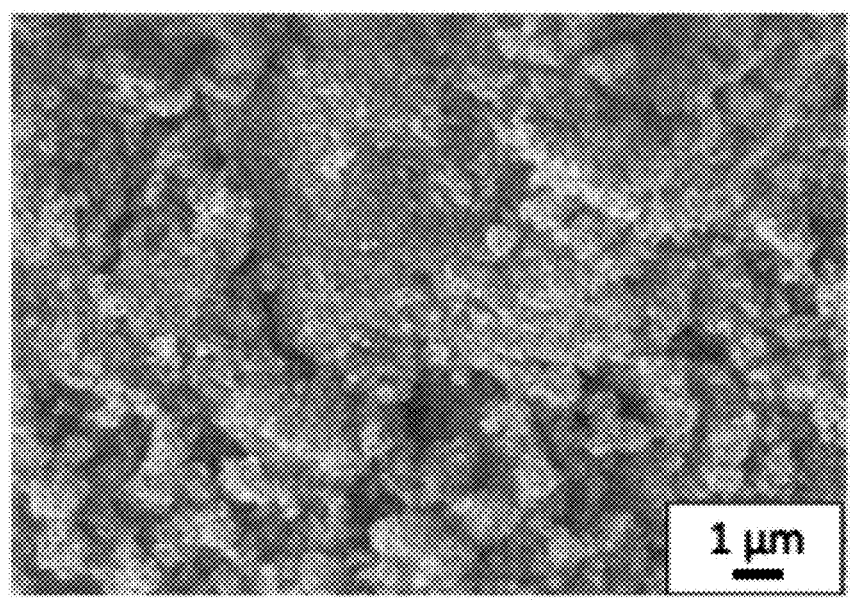
FIG. 21 is a photograph of titanium composite oxide particles in Production Example 11 captured using a field emission scanning electron microscope (EDS).

Also, the titanium composite oxide particles in Production Example 11 were subjected to field emission scanning electron microscope (EDS) analysis to obtain an atomic number ratio of the titanium composite oxide particles. From the results, it was confirmed that a composition of the titanium composite oxide particles in Production Example 11 was Ti—$MoO_2$ containing 20% by atom of Mo. FIG. 21 is a photograph of the titanium composite oxide particles in Production Example 10 captured using a field emission scanning electron microscope (EDS).

Consideration

FIG. 17 is a chart showing the X-ray diffraction results of the titanium composite oxide particles in Production Examples 1 to 11 and the titanium oxide particles (TIO-7 (Japan reference catalyst)) used in Example 12. The element names described as the legend of the spectrum shown in FIG. 17 are metal elements other than titanium contained in the titanium composite oxide particles of each of the production examples. The number after the element name shown in FIG. 17 indicates the concentration (% by atom) of each element in the titanium composite oxide particles calculated using the EDS analysis result.

For comparison, FIG. 17 shows the X-ray diffraction data (American Mineralogist Crystal Structure Database, database codes 0010735, 0005164, and 0018822) of tenorite (copper oxide (II) (CuO)) and titanium oxide (anatase type titanium oxide or rutile typetitanium oxide).

From FIG. 17, it can be seen that the titanium composite oxide particles in Production Example 6 containing Co and the titanium composite oxide particles in Production Example 8 containing Mn exist with an anatase type crystal structure and a rutile type crystal structure together. It can be seen that, in the titanium composite oxide particles in Production Example 9 containing Cu, an anatase type and tenorite exist together. Furthermore, it was found that the other titanium composite oxide particles (Production Examples 1 to 5, 7, 10, and 11) had only an anatase type crystal structure.

Catalyst Evaluation of Titanium Composite Oxide Particles

Example 26: Preparation of Electrodes

Production of Titanium Plate Having Titanium Oxide Supported on Surface Thereof

A titanium plate (Nirako Co., Ltd.) having a thickness of 0.1 mm was cut into a rectangular having a length of 20 mm and a width of 25 mm and ultrasonically washed in hexane and ethanol for about 5 minutes to remove oil on a surface and dried. The dried titanium plate was introduced into a tubular furnace, heated to 450° C. for 30 minutes under air flow (60 ccm), and then heated at 450° C. for 1 hour. After that, when a temperature of the tubular furnace decreased to 300° C., an upper lid of the tubular furnace was opened and the tubular furnace was rapidly cooled using a fan to perform cooling to room temperature. Through the above steps, a titanium plate in Example 26 in which a titanium oxide was supported on a surface thereof was obtained.

Step of Supporting Titanium Composite Oxide Particles on Titanium Plate Having Titanium Oxide Supported on Surface Thereof The titanium composite oxide particles in Production Example 1 were ground in an agate mortar and about 2 mL of ethanol was added to obtain a suspension. The obtained suspension was applied to the entire front and back surfaces of the titanium plate in Example 26 by uniformly dropping the suspension using a micropipette and drying the suspension.

The dried titanium plate was put into a tubular furnace, heated to 500° C. for 30 minutes under air flow (60 ccm), and then heated at 500° C. for 1 hour. After that, when a temperature of the tubular furnace decreased to 420° C., an upper lid of the tubular furnace was opened and the tubular furnace was rapidly cooled using a fan to perform cooling to room temperature. Through the above steps, the electrode catalyst in Example 26 in which titanium composite oxide particles were supported on a titanium plate on which titanium oxide was supported on a surface thereof was obtained.

Production of Amino Acid

The electrode catalyst in Example 26 was installed on the working electrode 31 side of the electrochemical cell of FIG. 16 and 40 mL of a 0.5 mol/L sulfuric acid aqueous solution containing pyruvic acid which is an α-ketocarboxylic acid and hydroxylamine sulfate which is a nitrogen compound were input into the chamber 37 in a proportion shown in Table 6. Furthermore, 40 mL of a 0.5 mol/L sulfuric acid aqueous solution was input into the chamber 34 on the counter electrode 32 side.

Also, the solution in the chamber 37 on the working electrode 31 side and the sulfuric acid aqueous solution in the chamber 34 on the counter electrode 32 side were degassed using argon bubbling for about 30 minutes under ice cooling (0° C.).

Subsequently, constant potential electrolysis (Chronoamperometry (CA)) was performed at a potential of −0.50 V (vs. reversible hydrogen electrode (RHE)) for 2 hours at 0° C. while stirring the solution in the chamber 37 and the sulfuric acid aqueous solution in the chamber 34 using the stirres 35 and 35.

After that, it was confirmed that the solution in the chamber 37 on the working electrode 31 side which has been subjected to the constant potential electrolysis (CA) was subjected to $^1$H NMR measurement to obtain alanine.

After that, the pyruvic acid conversion rate, the amino acid yield, and the Faraday efficiency of amino acid production in the reaction in Example 26 were calculated. The results are shown in Table 6.

Examples 27 to 36

The same operation as in Example 26 was performed except that the titanium composite oxide particles in Production Examples 2 to 11 were used instead of the titanium composite oxide particles in Production Example 1 to obtain electrode catalysts in Examples 27 to 36 on which the titanium composite oxide particles were supported.

Constant potential electrolysis (CA) was performed in the same manner as in Example 26 using the electrode catalysts in Examples 27 to 36 instead of the electrode catalyst in Example 26.

The solution in the chamber 37 on the working electrode 31 side which has been subjected to the constant potential electrolysis (CA) was subjected to $^1$H NMR measurement in the same manner as in Example 26, and it was confirmed that alanine was produced.

After that, the pyruvic acid conversion rates, the amino acid yields, and the Faraday efficiencies of amino acid production in the reactions in Examples 27 to 36 were calculated. The results are shown in Table 6.

Example 37

The same operation as in Example 26 was performed except that the titanium oxide particles (TIO-7 (Japan reference catalyst)) used in Example 12 were used instead of the titanium composite oxide particles in Production Example 1 to obtain an electrode catalyst in Example 37 on which the titanium composite oxide particles are supported.

Constant potential electrolysis (CA) was performed in the same manner as in Example 26 using the electrode catalyst in Example 37 instead of the electrode catalyst in Example 26.

The solution in the chamber 37 on the working electrode 31 side which has been subjected to the constant potential electrolysis (CA) was subjected to $^1$H NMR measurement in the same manner as in Example 26, and it was confirmed that alanine was produced.

Figure 24:
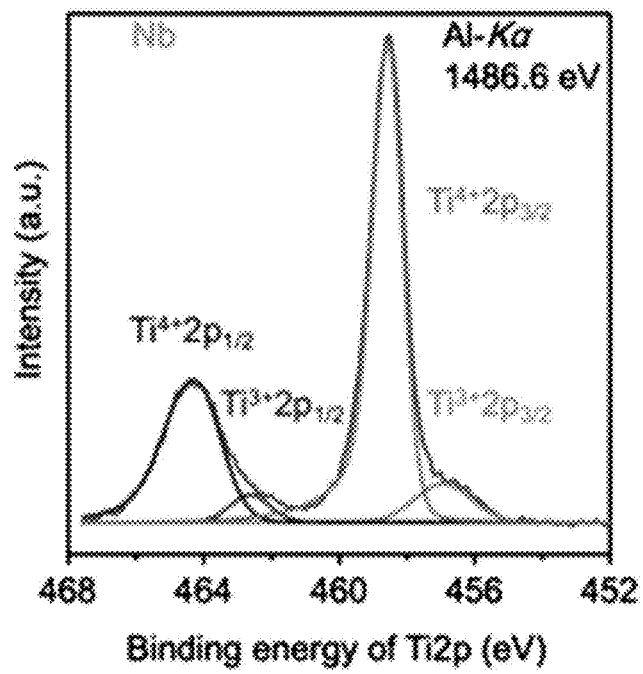
FIG. 24 is a spectrum of $2P_{1/2}$ and $2P_{3/2}$ of Ti measured using VersaProbe II manufactured by Ulvac for the titanium composite oxide particles in Production Example 1.

After that, the pyruvic acid conversion rate, the amino acid yield, and the Faraday efficiency of amino acid production in the reaction in Example 37 were calculated. The results are shown in Table 6.

spectra of Ti were measured using a VersaProbe II manufactured by Ulvac. The results of Production Example 1 are shown in FIG. 24.

Figure 26:
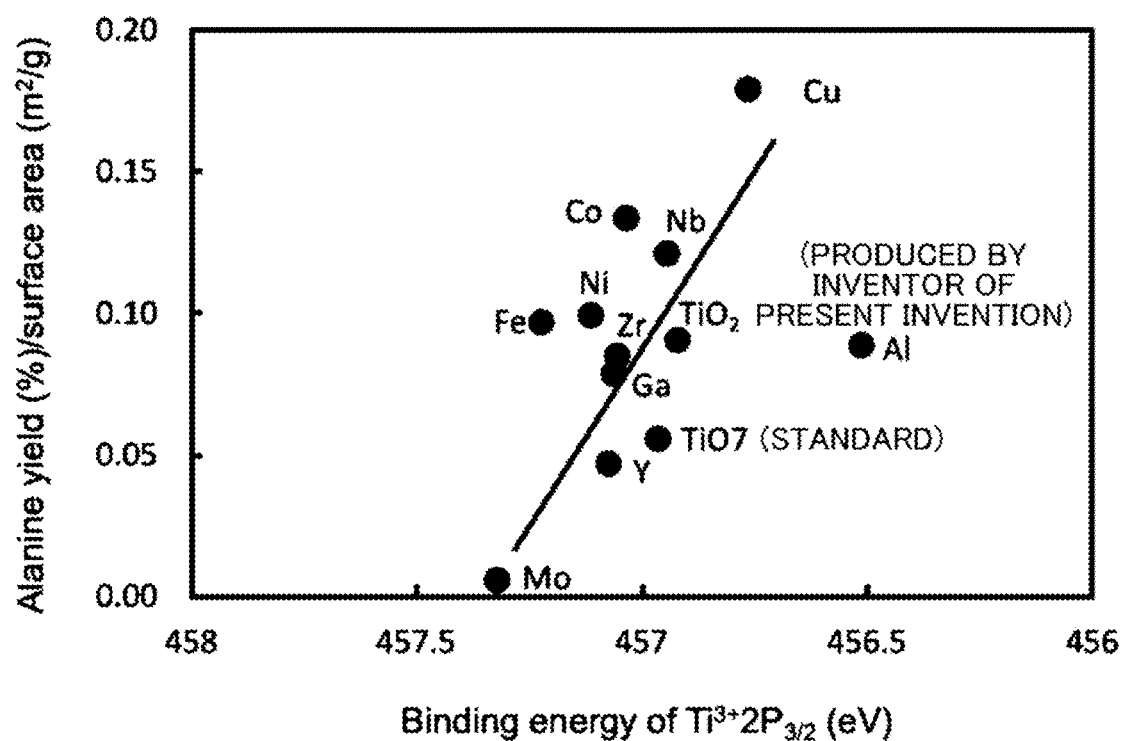
FIG. 26 is a graph for describing a relationship between binding energies of $Ti^{3+}$ of titanium composite oxide particles used in Examples 27 to 37 and yields of alanine per unit area in Examples 27 to 37.

From the results of X-ray photoelectron spectroscopy analysis and the $2P_{1/2}$ and $2P_{3/2}$ spectra of Ti, the binding energy of $Ti^{3+}$ of each of the titanium composite oxide particles was calculated and the relationship with the yield of alanine per unit area was investigated. The results are shown in FIG. 26. FIG. 26 is a graph for describing the

TABLE 6

| Example | Production example of titanium composite oxide particle | Reaction condition | | Result | | |
|---|---|---|---|---|---|---|
| | | Pyruvic acid concentration (mM) | $(NH_2OH)_2 \cdot 2H_2SO_4$ concentration (mM) | Pyruvic acid conversion rate (%) | Alanine yield (%) | Faraday efficiency of alanine production (%) |
| Example 26 Ti—Nb20% $O_2$ | Production Example 1 | 160 | 96 | 15.2 | 14.1 | 90.2 |
| Example 27 Ti—Fe6% $O_2$ | Production Example 2 | 160 | 96 | 9.9 | 12.7 | 114.9 |
| Example 28 Ti—Ga6% $O_2$ | Production Example 3 | 160 | 96 | 11.7 | 10.3 | 79.5 |
| Example 29 Ti—Al20% $O_2$ | Production Example 4 | 160 | 96 | 8.5 | 8.8 | 96.7 |
| Example 30 Ti—Ni14% $O_2$ | Production Example 5 | 160 | 96 | 13.9 | 8.4 | 60 |
| Example 31 Ti—Co6% $O_2$ | Production Example 6 | 160 | 96 | 15.6 | 7.9 | 66.1 |
| Example 32 Ti—Y16% $O_2$ | Production Example 7 | 160 | 96 | 16.1 | 7.1 | 65.5 |
| Example 33 Ti—Mn10% $O_2$ | Production Example 8 | 160 | 96 | 8.7 | 5.7 | 69.3 |
| Example 34 Ti—Cu12% $O_2$ | Production Example 9 | 160 | 96 | 5.8 | 5.2 | 70.3 |
| Example 35 Ti—Zn19% $O_2$ | Production Example 10 | 160 | 96 | 6.5 | 4.7 | 76.5 |
| Example 36 Ti—Mo20% $O_2$ | Production Example 11 | 160 | 96 | 0.1 | 0.7 | 11.2 |
| Example 37 TIO-7 | Japan reference catalyst | 160 | 96 | 12.2 | 12.2 | 101 |

Relationship with Specific Surface Area

Figure 23:
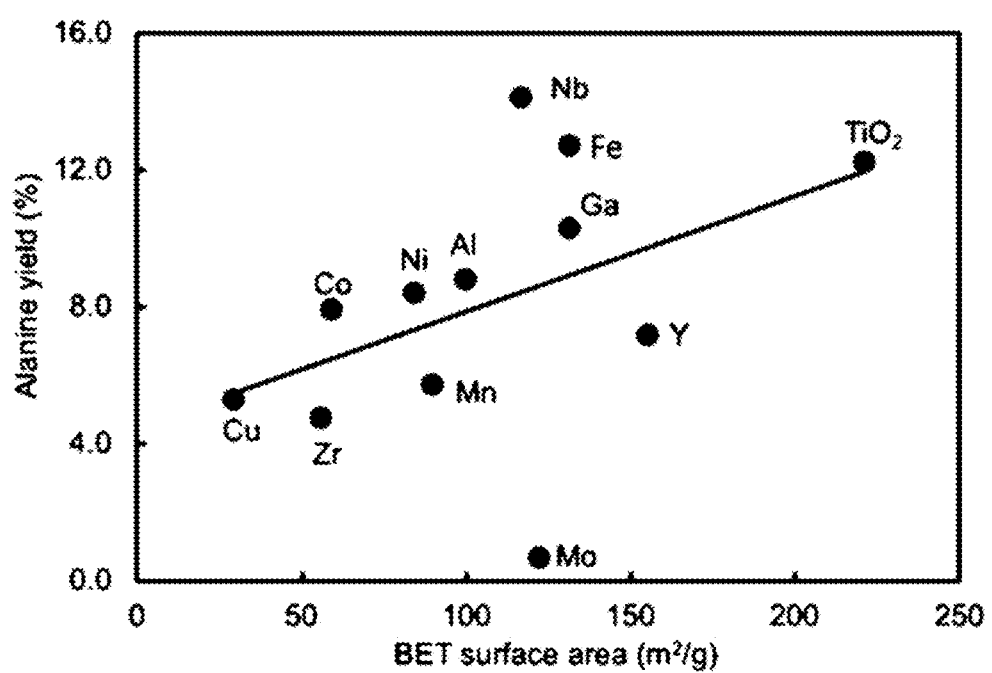
FIG. 23 is a graph showing a relationship between specific surface areas of titanium composite oxide particles used in Examples 27 to 37 and yields of alanine in Examples 27 to 37.

With regard to each of the titanium composite oxide particles used in Examples 27 to 37, a nitrogen adsorption curve at 77K was measured using a BET method (BEL-SORP-mid-2-SP) to obtain a specific surface area. The results are shown in FIG. 23. FIG. 23 is a graph for describing a relationship between the specific surface area of each of the titanium composite oxide particles used in Examples 27 to 37 and the yield of alanine in Examples 27 to 37. The element names described as the legend of a plot shown in FIG. 23 are metal elements other than titanium contained in the titanium composite oxide particles in each of the embodiments.

From FIG. 23, it can be seen that the titanium composite oxide particles having a large specific surface area have a large activity. However, since the activity per area of the titanium composite oxide particles containing Nb is different from that of other titanium composite oxide particles, it is suggested that another catalytic activity mechanism is working.

Figure 25:
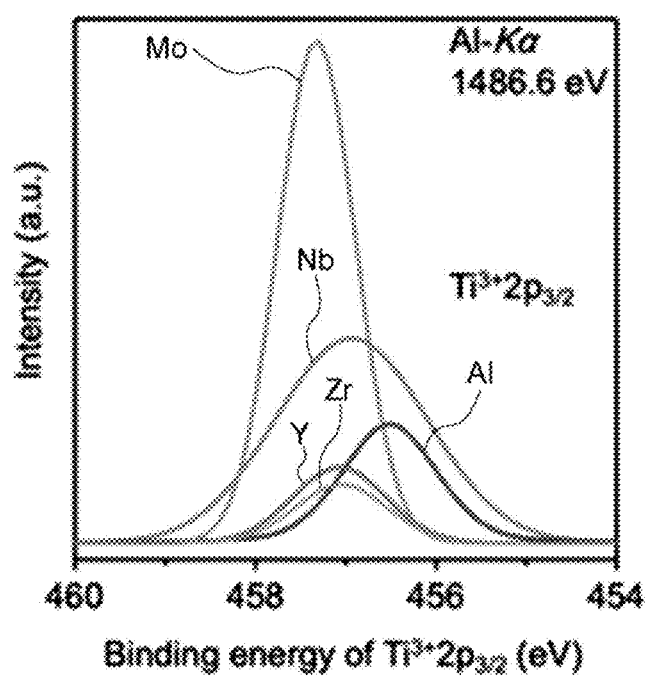
FIG. 25 is a graph for describing the results of X-ray photoelectron spectroscopy analysis of the titanium composite oxide particles in Production Examples 1, 4, 7, 10, and 11.

Each of the titanium composite oxide particles used in Examples 27 to 37 was subjected to X-ray photoelectron spectroscopy analysis to investigate an electronic state. The results of the titanium composite oxide particles in Production Examples 1, 4, 7, 10, and 11 are shown in FIG. 25.

Also, with regard to each of the titanium composite oxide particles used in Examples 27 to 37, the $2P_{1/2}$ and $2P_{3/2}$ relationship between the binding energy of $Ti^{3+}$ of each of the titanium composite oxide particles used in Examples 27 to 37 and the yield of alanine per unit area in Examples 27 to 37. The element names described as the legend of a plot shown in FIG. 26 are metal elements other than titanium contained in the titanium composite oxide particles of each of the examples.

From FIG. 26, it was clarified that high catalytic activity is exhibited in the titanium composite oxide particles when the binding energy of $Ti^{3+}$ is small. $Ti^{3+}$ is considered to be a state in which one electron is introduced into the 3d orbital of Ti containing a conduction band. Therefore, in the titanium composite oxide particles in which metal ions such as Nb are introduced at a Ti position, the electrons introduced from the electrode into the conductor are in a higher energy state than that of pure $TiO_2$ and exhibit a stronger reducing property. Thus, it is considered that the catalyst characteristics are improved. Therefore, it is considered that the titanium composite oxide particles showing high activity contain $Ti^{3+}$ in a more reduced electronic state or ions of the introduced metal in addition to having a large non-surface area.

As described above, in the composite oxide of the titanium oxide, the activity of the electrochemical reduction reaction in the presence of hydroxylamine of pyruvic acid differs depending on the metal species to be introduced.

Among the titanium composite oxide particles used in Examples 27 to 37, the titanium composite oxide particles showing the highest activity was the titanium composite oxide particles in which 20% by atom of Nb was introduced.

REFERENCE SIGNS LIST

1A Amine compound synthesizing device
1 Support layer
2 Electrode support
3 Catalyst layer
4 Support
10 Cathode
11 Anode
12 Electrolyte membrane
21 Working electrode
22 Counter electrode
23 Reference electrode
31 Working electrode
32 Counter electrode
33 Reference electrode
36 Cation exchange membrane
100 Membrane electrode assembly for synthesizing amine compound
102 First supply device
103 Second supply device

What is claimed is:

1. A method for producing an amine compound using an electrochemical cell including an anode and a cathode, the method comprising steps of:
supplying water or steam to the anode;
supplying an α-keto acid and a hydroxylamine to the cathode; and
applying a voltage between the anode and the cathode,
wherein on the anode, the water is decomposed to generate protons which reach the cathode;
on the cathode, a reductive amination reaction, in which the α-keto acid and the hydroxylamine are used as raw materials, occurs;
the amine compound is an amino acid;
the cathode comprises an electrode catalyst in which a metal oxide is supported on an electrode support composed of a conductive substance;
the conductive substance comprises one or more metals selected from the group consisting of a transition metal and a metal in Groups 12 to 14, or a carbon-based material;
the metal oxide supported on the electrode support is an oxide of a metal having the same element as the metal comprised in the conductive substance; and
fine particles of a metal oxide wherein the metal is titanium or a metal comprising titanium are further supported on the metal oxide supported on the electrode support.

2. The method for producing an amine compound according to claim 1, wherein the fine particles of a metal oxide wherein the metal is titanium or a metal comprising titanium comprise composite oxides represented by the following Formula [1A]:

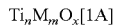

$Ti_nM_mO_x$ [1A]

wherein in Formula [1A], M is one or more metals selected from the group consisting of a transition metal and a metal in Groups 12 to 14;
x is a value which satisfies an oxidation state of Ti and M;
$0<n\leq1$, $0\leq m<1$, $n+m=1$; and
when m=0, Formula [1A] represents titanium oxide.

3. The method for producing an amine compound according to claim 1, wherein the electrochemical cell further comprises an electrolyte membrane provided between the anode and the cathode, and
the protons generated on the anode pass through the electrolyte membrane to the cathode.

4. The method for producing an amine compound according to claim 1, wherein the electrochemical cell comprises a membrane electrode assembly for synthesizing the amine compound, where the membrane electrode assembly for synthesizing the amine compound comprises the anode, an electrolyte membrane, and the cathode in that order,
the protons generated on the anode pass through the electrolyte membrane to the cathode.

* * * * *